(12) United States Patent
Pertsel

(10) Patent No.: US 11,586,843 B1
(45) Date of Patent: Feb. 21, 2023

(54) GENERATING TRAINING DATA FOR SPEED BUMP DETECTION

(71) Applicant: Ambarella International LP, Santa Clara, CA (US)

(72) Inventor: Shimon Pertsel, Mountain View, CA (US)

(73) Assignee: Ambarella International LP, Santa Clara, CA (US)

(*) Notice: Subject to any disclaimer, the term of this patent is extended or adjusted under 35 U.S.C. 154(b) by 334 days.

(21) Appl. No.: 16/831,549

(22) Filed: Mar. 26, 2020

(51) Int. Cl.
| *B60Q 9/00* | (2006.01) |
| *G06N 3/08* | (2006.01) |
| *G06K 9/62* | (2022.01) |
| *G06K 9/00* | (2022.01) |
| *G06N 5/04* | (2006.01) |
| *B60W 10/18* | (2012.01) |
| *B60W 10/22* | (2006.01) |
| *B60W 30/02* | (2012.01) |
| *B60W 40/076* | (2012.01) |
| *G06V 20/58* | (2022.01) |

(52) U.S. Cl.
CPC ......... *G06K 9/6256* (2013.01); *B60W 40/076* (2013.01); *G06V 20/58* (2022.01); *B60W 2520/16* (2013.01); *B60W 2520/18* (2013.01); *B60W 2552/35* (2020.02)

(58) Field of Classification Search
None
See application file for complete search history.

(56) References Cited

U.S. PATENT DOCUMENTS

| 2012/0323474 | A1* | 12/2012 | Breed | B60W 30/18154 |
| | | | | 701/117 |
| 2020/0309541 | A1* | 10/2020 | Lavy | G01C 21/1656 |
| 2021/0001885 | A1* | 1/2021 | Zhang | B60W 30/09 |
| 2021/0094534 | A1* | 4/2021 | Hyun | B60W 30/025 |
| 2021/0139028 | A1* | 5/2021 | Zhou | B60W 40/11 |
| 2021/0197720 | A1* | 7/2021 | Houston | B60Q 9/008 |

* cited by examiner

*Primary Examiner* — Adam D Tissot
*Assistant Examiner* — Laura E Linhardt
(74) *Attorney, Agent, or Firm* — Christopher P. Maiorana, PC

(57) ABSTRACT

An apparatus including a capture device and a processor. The capture device may be configured to generate pixel data corresponding to an exterior view from a vehicle. The processor may be configured to generate video frames from the pixel data, perform computer vision operations on the video frames to detect objects in the video frames and determine characteristics of the objects, detect a change in orientation of the vehicle at a first time, analyze the characteristics of the objects at a second time to determine a cause of the change in orientation of the vehicle and generate annotations for the video frames that comprise the objects determined to have caused the change in orientation of the vehicle. The second time may be earlier than the first time.

20 Claims, 14 Drawing Sheets

GENERATING TRAINING DATA FOR SPEED BUMP DETECTION

FIELD OF THE INVENTION

The invention relates to computer vision generally and, more particularly, to a method and/or apparatus for implementing generating training data for speed bump detection.

BACKGROUND

Autonomous vehicles rely on computer vision and other sensors to perceive the world around the autonomous vehicle. Camera perception based on neural networks is becoming the main perception modality for autonomous vehicles. Neural networks used for computer vision rely on large sets of training data to accurately detect the environment. One of the biggest challenges is collecting a wide variety of training data and ensuring that the training data is properly labeled. Acquiring and properly labeling training data is one of the most resource intensive, costly and slow processes during the development of convolutional neural networks.

One of the perception tasks that needs to be handled by L2+ and higher level autonomous driving systems is detecting the shape of the road. Knowing the location of potholes, road bumps and the general slope of the road is important for making proper decisions in path planning and speed control in autonomous vehicles. For example, the vehicle is expected to slow down ahead of a speed bump (which is why the speed bump is there in the first place). Acquiring and labeling training data is a challenging task in terms of data collection because speed bumps can look very different in different countries (i.e., various depth, height, colors, patterns, etc.).

It would be desirable to implement generating training data for speed bump detection.

SUMMARY

The invention concerns an apparatus comprising a capture device and a processor. The capture device may be configured to generate pixel data corresponding to an exterior view from a vehicle. The processor may be configured to generate video frames from the pixel data, perform computer vision operations on the video frames to detect objects in the video frames and determine characteristics of the objects, detect a change in orientation of the vehicle at a first time, analyze the characteristics of the objects at a second time to determine a cause of the change in orientation of the vehicle and generate annotations for the video frames that comprise the objects determined to have caused the change in orientation of the vehicle. The second time may be earlier than the first time.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing training data for speed bump detection that may (i) detect a change in orientation of a vehicle caused by a speed bump or pothole, (ii) analyze video frames from before the change in orientation after the change in orientation has been detected, (iii) detect objects that caused a change in orientation of the vehicle, (iv) annotate and label objects that caused the change in orientation of the vehicle, (v) upload the annotated video frames to a central service, (vi) provide training data for fleet learning and/or (vii) be implemented as one or more integrated circuits.

Embodiments of the present invention may be configured to implement automatic labeling of detected objects. Automatic labeling and object detection may be utilized in a vehicle on the road. Utilizing automatic labeling and object detection on the road may enable machine learning to be performed as the vehicle drives around and experiences various situations.

Embodiments of the present invention may utilize wireless connectivity. For example, vehicles may provide wireless connectivity for over-the-air updates and other communications. Leveraging the connectivity of vehicles may enable a customer fleet of cars to capture training data of a wide variety of scenarios. The automatic labeling and object detection may be used to provide training data for a convolutional neural network.

Embodiments of the present invention may be configured to automatically detect speed bumps (or other obstacles) using a built-in gyroscope in an ego vehicle. Other obstacles may comprise rumble strips, potholes, road slopes, etc. Computer vision operations may be configured to correlate the detected obstacles with images (e.g., video frames) captured by cameras of the exterior of the ego vehicle. For example, the gyroscope may be used to detect a speed bump by detecting a brief change in orientation of the ego vehicle.

A sequence of video frames captured (e.g., by a front camera on the ego vehicle) from before the brief change in orientation may be analyzed to determine the object that caused the change in orientation. For example, the video frames immediately preceding the change in orientation may capture a video of the speed bump as the ego vehicle was approaching the speed bump. Computer vision operations may be performed to detect the object (e.g., a speed bump), annotate the object (e.g., provide an indication that the object is a speed bump), and then send the relevant information back to a central service (e.g., a cloud computing service) as additional data to enhance a training set for a neural network. The additional data used to enhance the training set for a convolutional neural network may be training data. Providing more training data may improve the detection of particular objects in the future.

Figure 1:
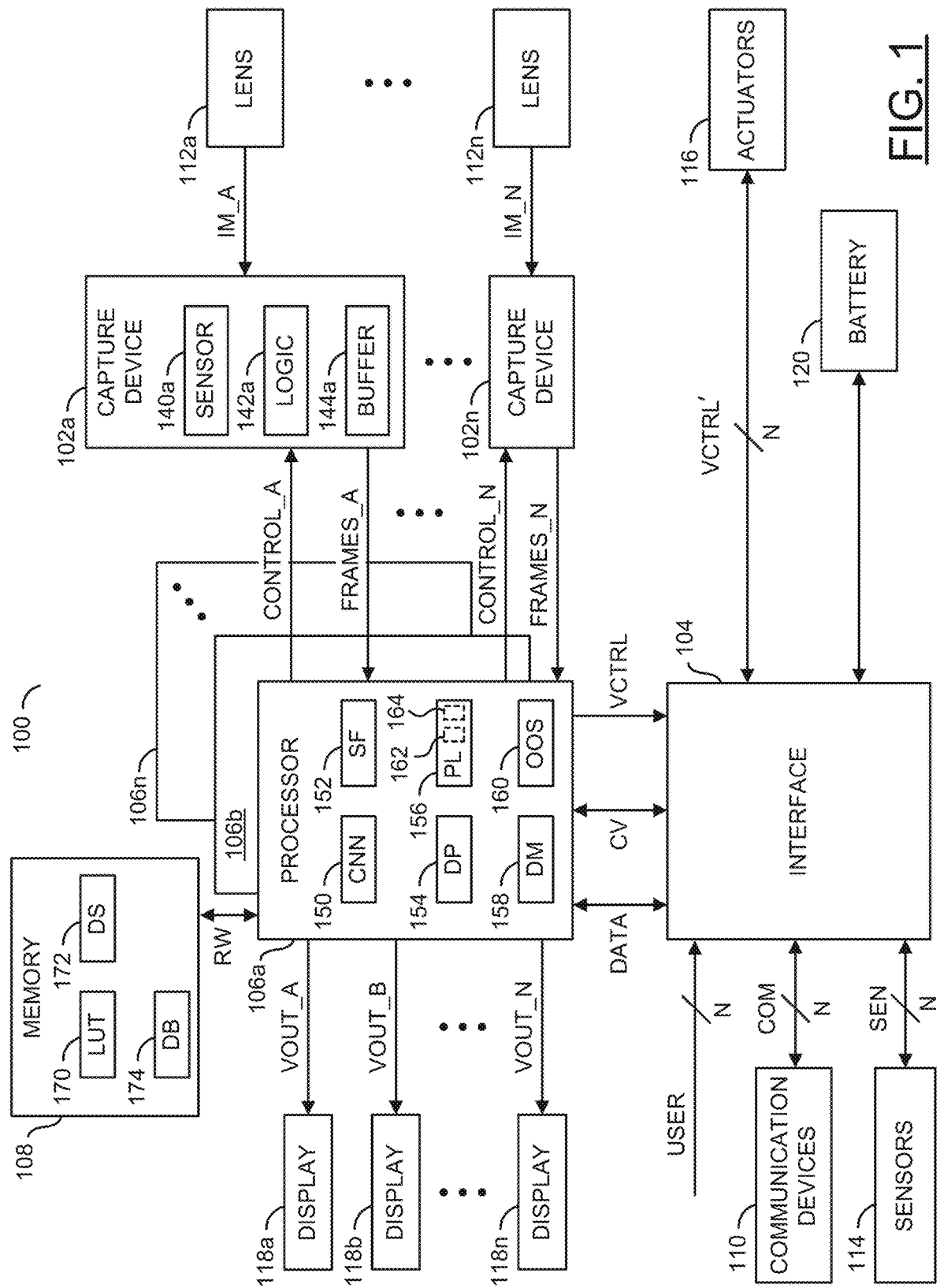
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
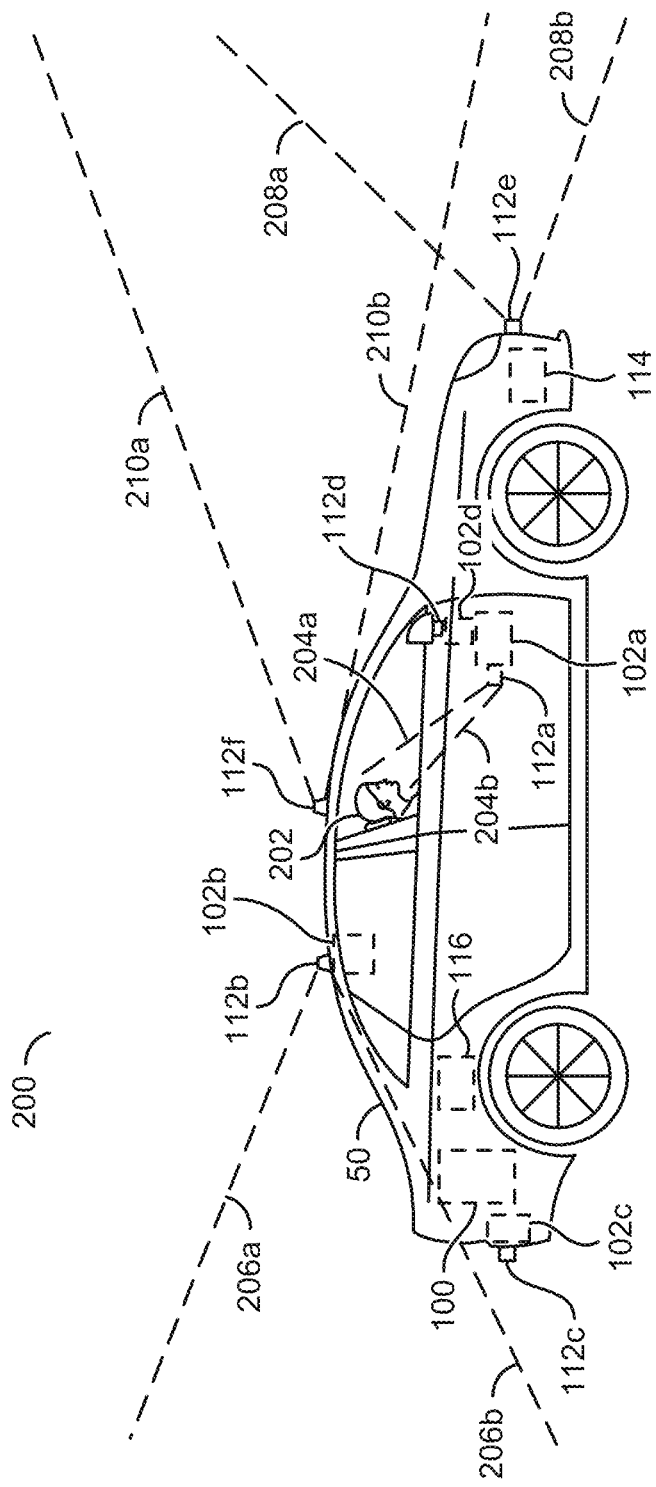
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112o) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
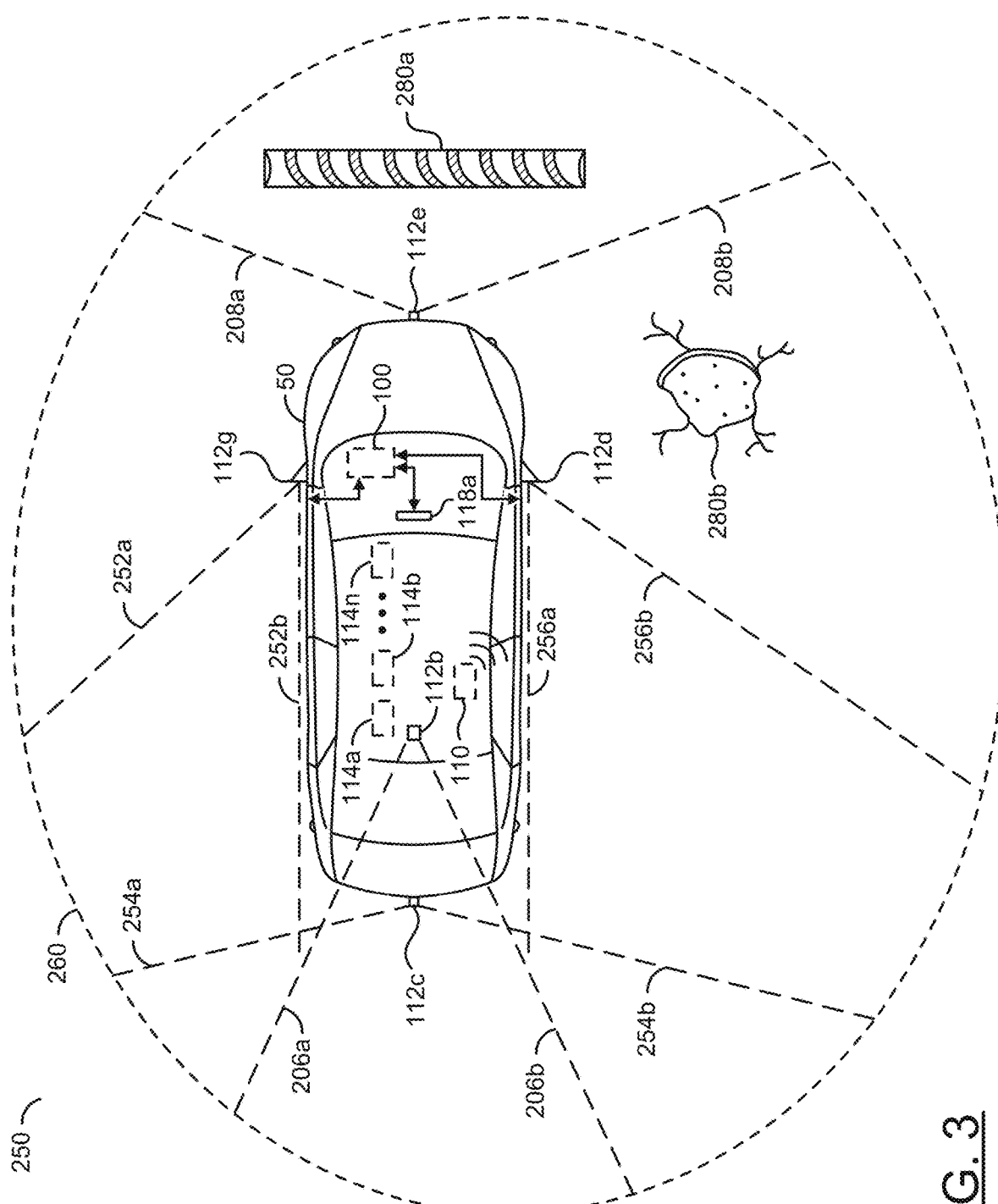
FIG. 3 is a diagram illustrating a 360 degree field of view captured by a vehicle.

Referring to FIG. 3, a diagram illustrating a 360 degree field of view captured by a vehicle is shown. An overhead view 250 of the ego vehicle 50 is shown. The apparatus 100 is shown within the ego vehicle 50. The communication device 110 is shown. The lenses 112a-112g are shown on the ego vehicle 50. The sensors 114a-114n are shown on the ego vehicle 50. The display 118a is shown within the ego vehicle 50. While only one of the displays 118a is shown as a representative example, generally the ego vehicle 50 may comprise more than one of the displays 118a-118n.

Each of the lenses 112a-112g may be directed to capture a different field of view. As shown in association with FIG. 2, the lens 112b may capture the field of view 206a-206b, the lens 112e may capture the field of view 208a-208b and the lens 112f may capture the field of view 210a-210b. Dotted lines 252a-252b are shown. The dotted lines 252a-252b may represent the field of view captured by the lens 112g (shown directed towards a rear of the ego vehicle 50 from the driver side mirror location). Dotted lines 254a-254b are shown. The lines 254a-254b may represent the field of view captured by the lens 112c (shown directed behind the ego vehicle 50 from the rear bumper location). Dotted lines 256a-256b are shown. The lines 256a-256b may represent the field of view captured by the lens 112d (shown directed towards a rear of the ego vehicle 50 from the passenger side mirror location). In an example, each of the fields of view captured by the lenses 112a-112g may be presented as video data to the displays 118a-118n and/or analyzed by the processors 106a-106n. The lenses 112a-112g and the corresponding fields of view (e.g., the fields of view 206a-206b, 208a-208b, 210a-210b, 252a-252b, 254a-254b and 256a-256b) are shown as an illustrative example. More lenses (e.g., the lenses 112a-112n) and/or fields of view may be captured by the apparatus 100.

A dotted circle 260 is shown. The dotted circle 260 may represent an exterior field of view from the perspective of the ego vehicle 50 captured by the apparatus 100. The processors 106a-106n may be configured to combine the video data captured by the capture devices 102a-102n to form the exterior field of view 260. The exterior field of view 260 may be a 360 degree field of view (e.g., a field of view that captures video data in all or most directions around the ego vehicle 50, a field of view that surrounds the ego vehicle 50, etc.). The lenses 112a-112g and the corresponding fields of view (e.g., the fields of view 206a-206b, 208a-208b, 210a-210b, 252a-252b, 254a-254b and 256a-256b) and/or data from other lenses (e.g., the lenses 112h-112n, not shown) may be combined to enable the processors 106a-106n to have access to video data over the full 360 degree field of view 260.

In some embodiments, the processors 106a-106n may be configured to perform video stitching operations and/or de-warping operations to form the 360 degree field of view 260. In some embodiments, the processors 106a-106n may be configured to analyze the video data captured by each of the capture devices 102a-102n and aggregate the results to make inferences about all the video data in the 360 degree field of view 260 (e.g., the video data from each field of view may be analyzed individually, and the results may be combined to effectively create the 360 degree field of view 260, even if a single video stream of all 360 degrees around the ego vehicle 50 is never actually created).

While a generally circular shape for the 360 degree field of view 260 is shown, the particular shape of the 360 degree field of view 260 may not be circular. For example, the range of each of the capture devices 102a-102n may be different. In another example, the physical location of the capture devices 102a-102n on the ego vehicle 50 may determine how far from the ego vehicle 50 the field of view 260 is able to reach. The 360 degree field of view may have an irregular shape. The circular shape of the 360 degree field of view 260 is shown for illustrative purposes. For example, the range of the 360 field of view 260 may extend farther from the ego vehicle 50 than shown. In some embodiments, the 360 degree field of view 260 may be spherical (e.g., capture the environment above the ego vehicle 50). In some embodiments, the field of view 260 may not be a full 360 degree field of view (e.g., locations below the ego vehicle 50 may not be captured).

The processors 106a-106n may be further configured to perform computer vision operations on the video data captured in the 360 degree field of view 260 (which may provide an approximation of what the driver 202 would be able to see if the driver 202 was in the ego vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

The sensor fusion module 152 may be configured to combine information about the objects detected from analyzing the video data captured with a detection of objects using the proximity sensors (e.g., one or more of the sensors 114a-114n configured to implement radar, lidar, etc.). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the sensors 114a-114n, the distance limitations of the sensors 114a-114n, whether the computer vision detects the object at a distance beyond the range of the sensors 114a-114n, etc.). The ego vehicle 50 may implement the apparatus 100 that enables computer vision and 360 degree cameras to provide the exterior field of view 260 and the additional sensors 114a-114n (e.g., such as ultrasonics, radars, gyroscope, accelerometer, etc.).

The processors 106a-106n may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to (e.g., avoid collisions, provide warnings, store information, avoid roadway hazards such as potholes, etc.). For example, whether a detected scenario is considered an event may be determined by the decision module 158. In one example, the event may correspond to detecting that another vehicle, a pedestrian, a speed bump or another obstacle may be on a collision course with the ego vehicle 50. The events may be detected based on the computer vision operations performed on the video data captured using the lenses 112a-112n. The events may be detected based on readings from the sensors 114a-114n. For example, the sensor fusion module 152 may be configured to combine information determined using the computer vision operations and information detected using the sensors 114a-114n to make inferences that may be used by the decision module 158.

An obstacle 280a and an obstacle 280b are shown near the ego vehicle 50. The obstacle 280a may be a speed bump. The obstacle 280b may be a pothole. The obstacles 280a-280b may be examples of objects that may be detected by the computer vision operations performed by the processors 106a-106n. For example, the computer vision operations performed by the processors 106a-106n may be configured to detect the objects 280a-280b, determine a location of the objects 280a-280b with respect to the ego vehicle 50 (e.g., distance, direction, relative speed, etc.), determine a size/shape of the objects 280a-280b, determine other characteristics of the objects 280a-280b (e.g., perform optical character recognition (OCR) to read text written on the speed bump 280a, detect a paint pattern on the speed bump 280a, determine a height/depth of the objects 280a-280b, etc.), etc. The objects 280a-280b may be detected by the computer vision operations if the ego vehicle 50 is moving and/or if the ego vehicle 50 is stationary. The type of information detected by the processors 106a-106n about the objects 280a-280b may be varied according to the design criteria of a particular implementation.

The obstacles 280a may be detected in the field of view 208a-208b (e.g., in front of the ego vehicle 50). The apparatus 100 may detect the obstacles 280a-280b using the computer vision operations (e.g., by analyzing the pixel data of video frames captured by any of the capture devices 102a-102n). The apparatus 100 may further determine the presence of the obstacles 280a-280b in response to changes in the orientation of the ego vehicle 50. The obstacles 280a-280b may be objects that cause the ego vehicle 50 to change orientation (e.g., temporarily). Generally, for the sensors 114a-114n to detect the change in orientation of the ego vehicle 50, the ego vehicle 50 may drive over the obstacles 280a-280b. When driving over the obstacles 280a-280b, the front capture device 102e may be capturing the pixel data for the video frames used to perform the computer vision operations (e.g., cameras located on the side of the ego vehicle 50 may detect the objects 280a-280b but the ego vehicle 50 generally may not drive over the objects 280a-280b detected by side-mounted cameras).

One or more of the sensors 114a-114n may be configured to detect the change in orientation of the ego vehicle 50. In an example, the sensors 114i-114k may be configured as gyroscopes. The gyroscopes 114i-114k may be used in combination with the computer vision operations (e.g., using the sensor fusion module 152) to determine when the ego vehicle 50 has driven over the obstacles 280a-280b and then detect the pixel data that corresponds to the obstacles 280a-280b.

The processors 106a-106n may generate the signal VCTRL in response to detecting an event. The event may be detected in response to readings from the gyroscopes 114i-114k and/or determinations made from the results of the computer vision operations. In an example, the event may be determined when the ego vehicle 50 changes orientation. The change in orientation may be the result of the ego vehicle 50 traveling over the obstacles 280a-280b. When no event is detected, the processors 106a-106n may not generate the signal VCTRL.

In some embodiments, the processors 106a-106n may be configured to generate a notification as a response to the detected (or predicted) event. In one example, the notification may be communicated by the communication devices 110 to the driver 202 along with an annotated video stream. For example, when the decision module 158 determines that an event has been detected the processors 106a-106n may generate the notification as part of (or alongside) one or more of the signals VOUT_A-VOUT_N. In some embodiments, the notification may be communicated by the communication devices 110 to a remote device along with an annotated video stream. For example, when the decision module 158 determines that an event has been detected, the processors 106a-106n may generate the signal VCTRL, which may enable the signal COM to be communicated by the communication devices 110 to a remote device. In an example, the remote device may be a central server and/or a distributed computing service (to be described in association with FIG. 4 and/or FIG. 10).

The annotated video frames may comprise the pixel data that corresponds with the obstacles 280a-280b. The apparatus 100 may be configured to use disparate sources of information (e.g., the computer vision operations and readings from the gyroscopes 114i-114k) to detect the change in orientation of the ego vehicle 50 and/or the pixel data that corresponds to the obstacles 280a-280b. The change in orientation of the ego vehicle 50 may be one data source that indicates that the obstacles 280a-280b have been detected. The computer vision operations may be another data source that indicates that the obstacles 280a-280b have been detected. The combination of the data sources may be used to accurately identify the obstacles 280a-280b in the video frames. The annotations provided in the video frames communicated to the central/distributed server using the signal COM may be used as training data. The training data may be used to train the artificial intelligence model used for detecting objects by the CNN module 150.

Figure 4:
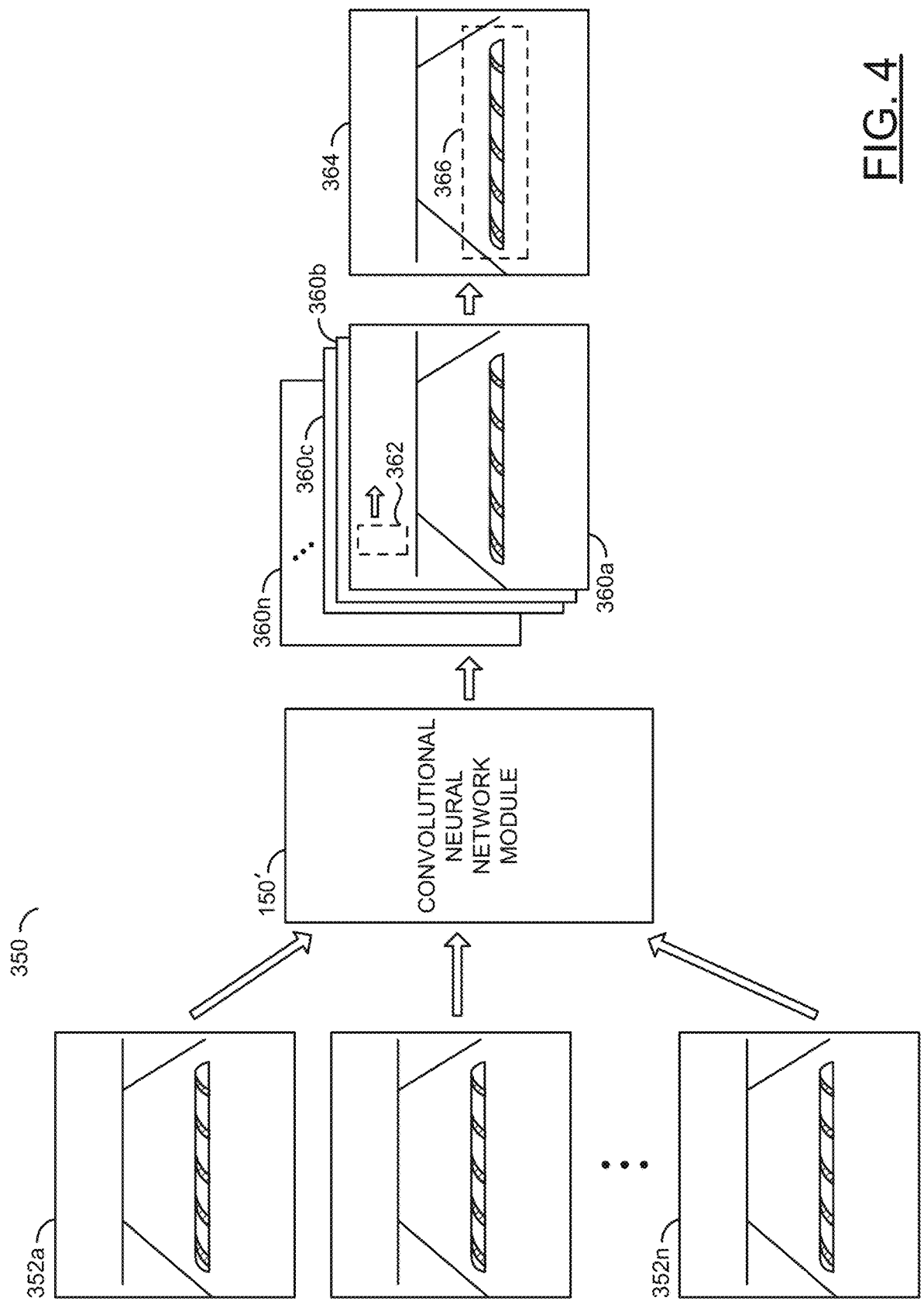
FIG. 4 is a diagram illustrating an example visualization of training a convolutional neural network for object detection using fleet learning.

Referring to FIG. 4, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture video data of a speed bump (e.g., captured from a front camera of the ego vehicle 50). For example, the training data 352a-352n may be a sequence of video frames captured prior to the processors 106a-106n determining that a change in orientation of the vehicle has occurred (e.g., caused by a speed bump, a pothole, etc.). The training data 352a-352n may be labeled based on whether the prediction was incorrect or correct. Using the training data 352a-352n (e.g., video frames captured from many different vehicles as the vehicles are produced), many training data sets may be available to train the CNN module 150'. In an example, different makes and models of vehicles may be analyzed. In another example, different interior colors may be analyzed. In yet another example, different drivers (e.g., different people) may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features, vehicles, pedestrians, etc.) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may receive and analyze input images (e.g., the training data 352a-352n) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 364. The reference video frame 364 may comprise masks and/or categorized instances of the reference objects 366. The reference objects 3366 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100 in a fleet of vehicles. The CNN module 150' may continue to receive the training data 352a-352n from each apparatus 100, refine the machine learning model, and then provide updates to the machine learning model for each apparatus 100. The centralized CNN module 150' may develop, refine and/or enhance the machine learning model by receiving input (e.g., the training data 352*a*-352*n*) from multiple sources (e.g., each vehicle that implements the apparatus 100).

In some embodiments, the machine learning may be performed by the CNN module 150 implemented by the processors 106*a*-106*n*. For example, the processors 106*a*-106*n* and/or the apparatus 100 may be an edge device, and the CNN module 150 may implement the machine learning model adapted to the constraints of the edge device. The processors 106*a*-106*n* may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106*a*-106*n*), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352*a*-352*n* would be kept local. Whether the machine learning is performed locally (e.g., at the edge), performed using a centralized resource and/or performed using a combination of local and centralized resources may be varied according to the design criteria of a particular implementation.

Figure 5:
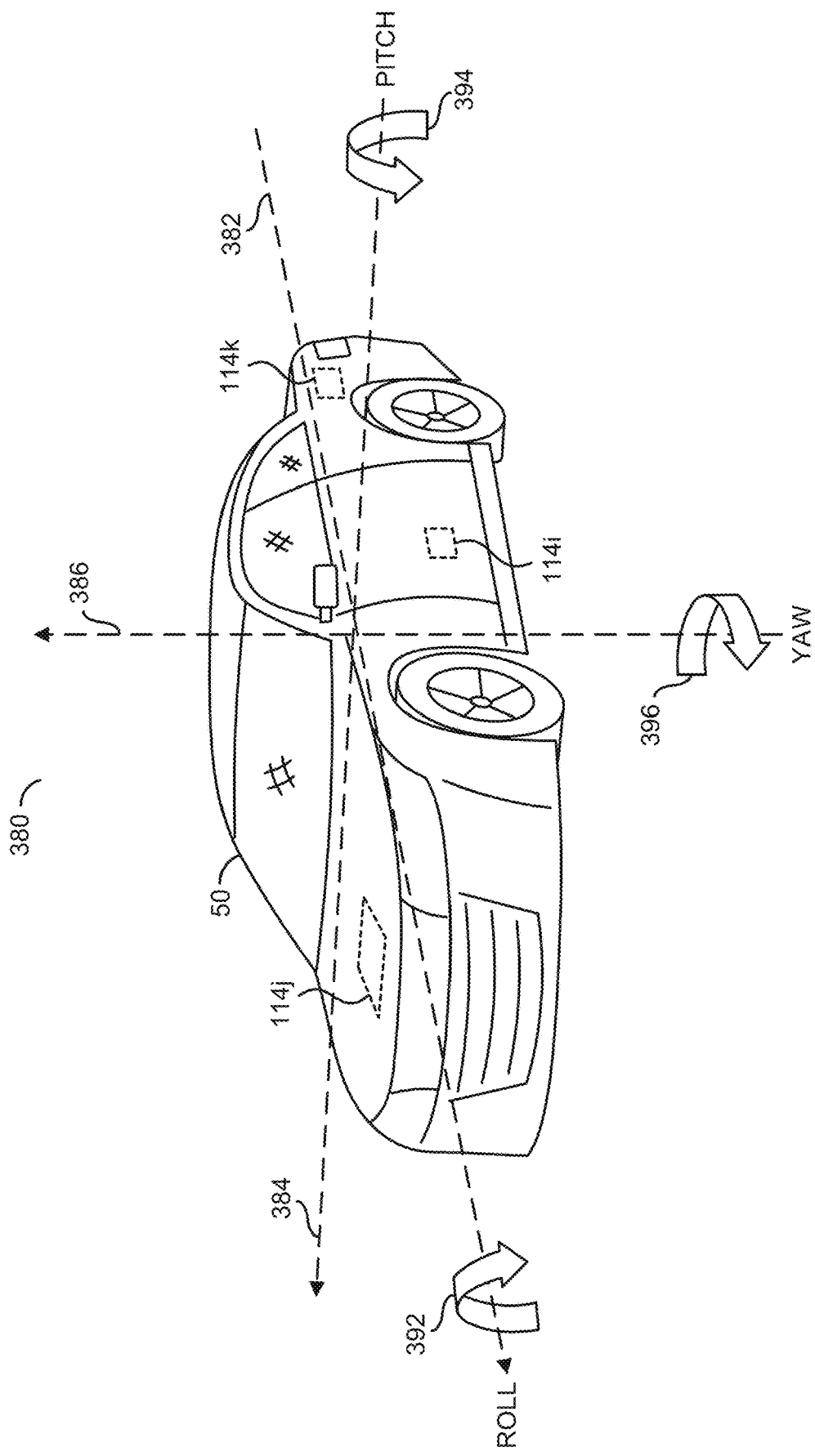
FIG. 5 is a diagram illustrating detecting a change in orientation of the ego vehicle.

Referring to FIG. 5, a diagram illustrating detecting a change in orientation of the ego vehicle is shown. A perspective view 380 of the ego vehicle 50 is shown. The perspective view 380 may comprise an axis 382, an axis 384 and an axis 386. The axes 382-386 may represent the principle axes of the ego vehicle 50.

The axis 382 may be a longitudinal axis. A curved arrow 392 is shown around the longitudinal axis 382. The curved arrow 392 may represent a roll rotation of the ego vehicle 50.

The axis 384 may be a transverse axis. A curved arrow 394 is shown around the transverse axis 384. The curved arrow 394 may represent a pitch rotation of the ego vehicle 50.

The axis 386 may be a vertical axis. A curved arrow 396 is shown around the vertical axis 386. The curved arrow 396 may represent a yaw rotation of the ego vehicle 50.

The apparatus 100 may be configured to detect a change in orientation of the ego vehicle 50. The change in orientation of the ego vehicle 50 detected may correspond to driving over the obstacles 280*a*-280*b* (or other obstacles). In one example, the change in orientation may be the pitch rotation 394 of the ego vehicle 50. In another example, the change in orientation may be the roll rotation 392. In yet another example, the change in orientation may be moving (e.g., acceleration) along the vertical axis 386. The type of change in orientation of the ego vehicle 50 detected by the processors 106*a*-106*n* may be varied according to the design criteria of a particular implementation.

Figure 7:
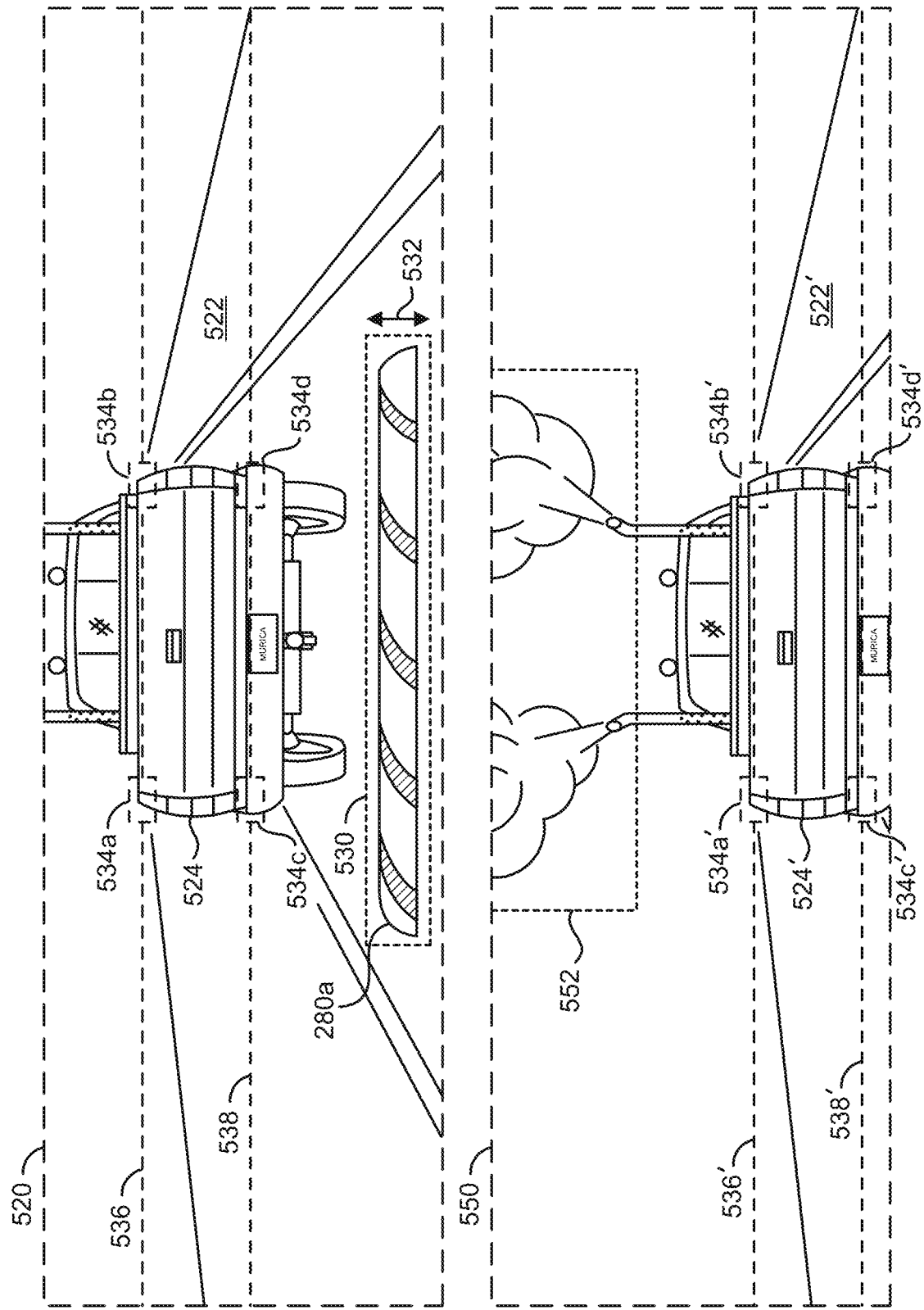
FIG. 7 is a diagram illustrating an example video frame of approaching a speed bump and an example video frame of traveling over a speed bump.
Figure 8:
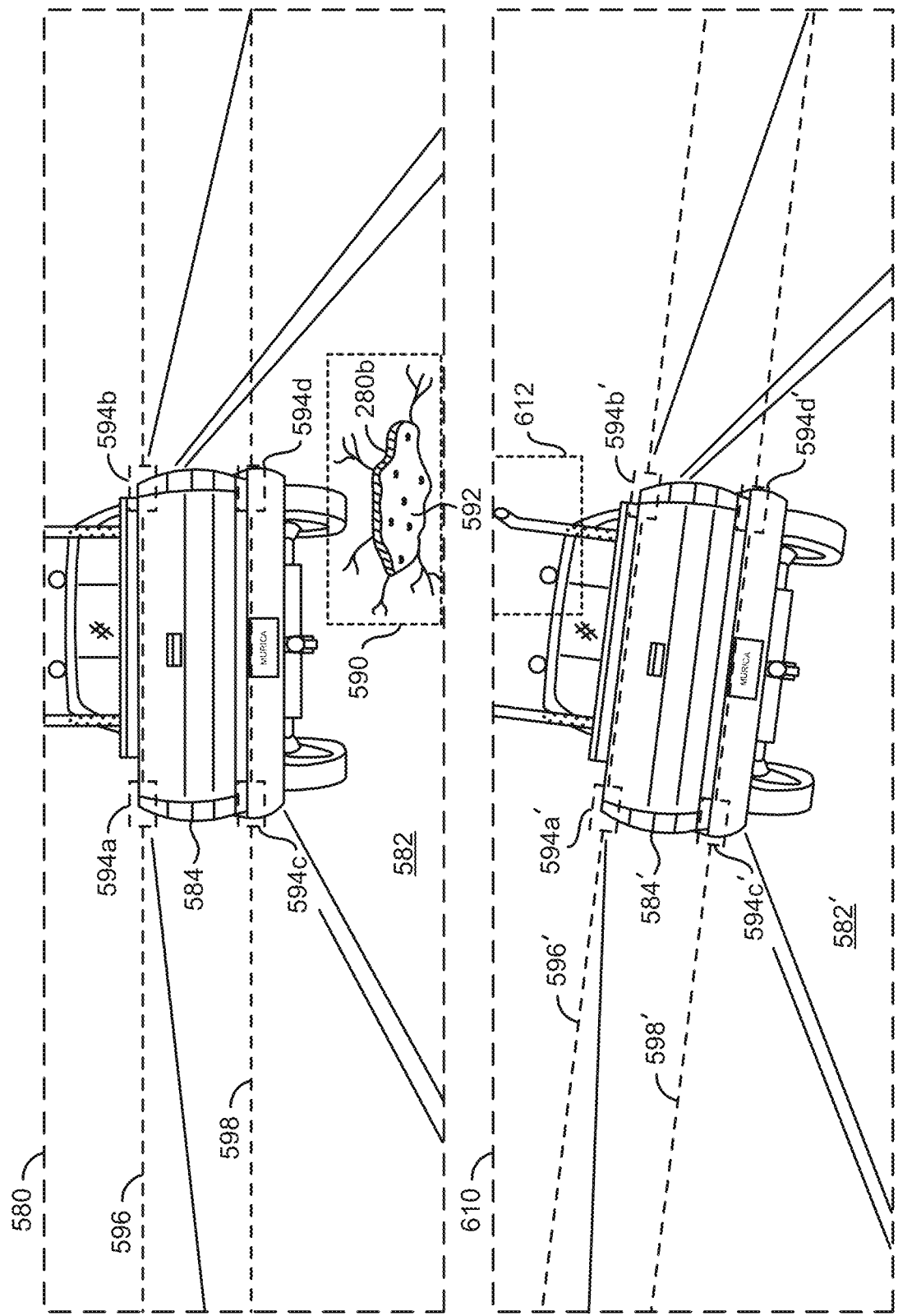
FIG. 8 is a diagram illustrating an example video frame of approaching a pothole and an example video frame of traveling over a pothole.
Figure 9:
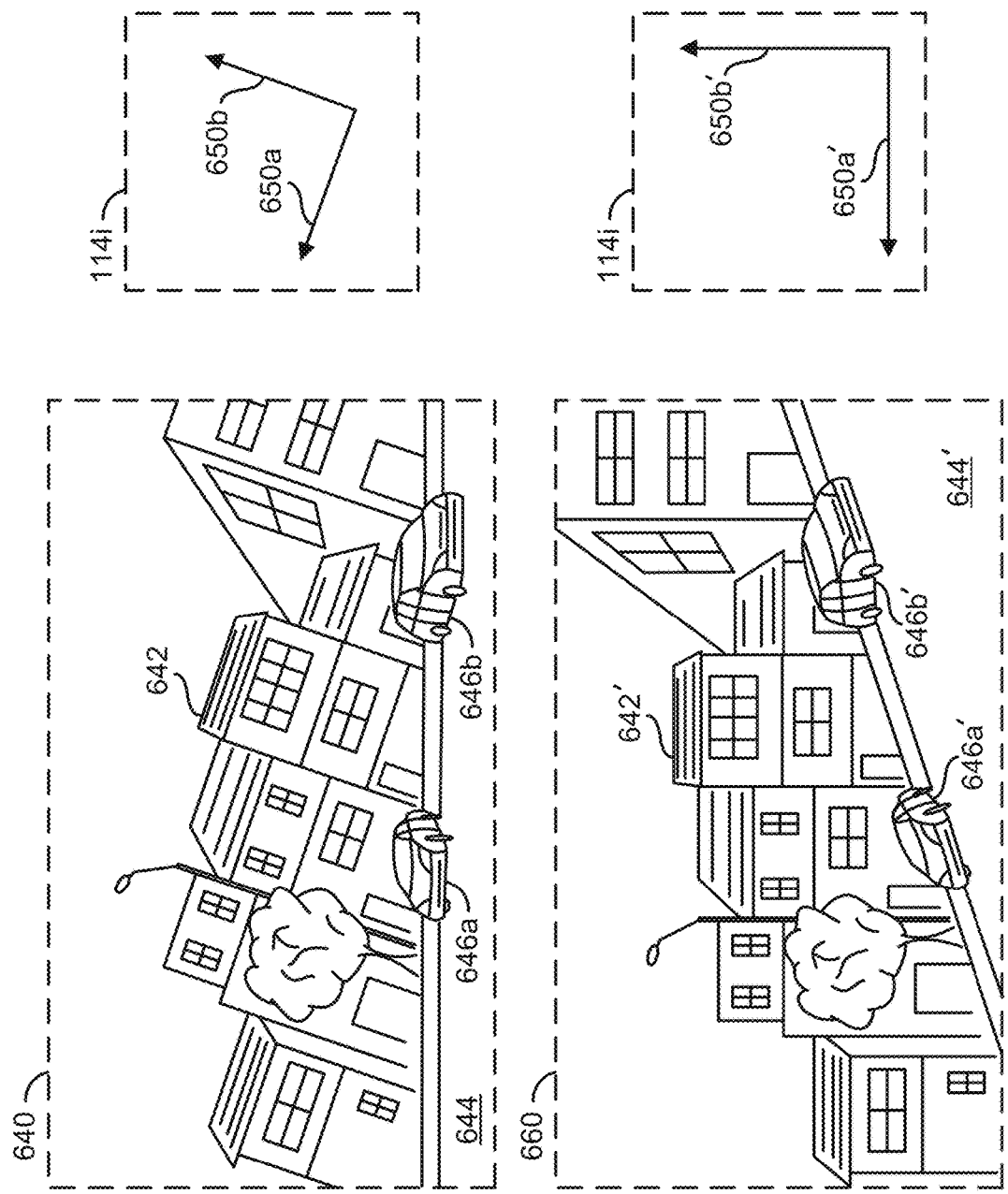
FIG. 9 is a diagram illustrating example video frames of a sloped road and readings from a gyroscope.

In some embodiments, the processors 106*a*-106*n* may be configured to detect the change in orientation of the ego vehicle 50 in response to performing the computer vision operations (e.g., to be described in more detail in association with FIGS. 7-9). In some embodiments, the processors 106*a*-106*n* may be configured to detect the change in orientation of the ego vehicle 50 in response to reading the sensor data SEN from the sensors 114*i*-114*k* (e.g., gyroscopes). In one example, the apparatus 100 may comprise multiple gyroscopes 114*i*-114*k* (e.g., the gyroscope 114*i* may read changes in orientation based on detecting the pitch rotation 394, the gyroscope 114*j* may read changes in orientation based on detecting roll rotation 392 and/or the gyroscope 114*k* may read changes in orientation based on detecting yaw rotation 396). In another example, the apparatus 100 may comprise one gyroscope 114*i* configured to read changes in orientation based on the roll rotation 392, the pitch rotation 394 and the yaw rotation 396. The arrangement, implementation and/or type of sensors 114*i*-114*k* used to determine the change in orientation of the ego vehicle 50 may be varied according to the design criteria of a particular implementation.

The change in orientation detected by the processors 106*a*-106*n* may be a temporary change. In an example, the ego vehicle 50 may respond to the obstacles 280*a*-280*b* with a change in orientation (e.g., driving over the speed bump 280*a*) and then returning to the previous orientation (e.g., after driving over the speed bump 280*a* the ego vehicle 50 may be driving on a regular flat road surface). If the processors 106*a*-106*n* detect the change in orientation over a longer period of time (e.g., a non-temporary change in orientation), a different scenario may be detected (e.g., driving on an incline, driving on a decline, driving along a curved/banked ramp, damage to the ego vehicle 50, etc.). In an example, when driving over the speed bump 280*a* or the pothole 280*b*, the change in orientation may last approximately one second. Generally, the change in orientation may be a small amount. In one example, the change in orientation may be imperceptible to a human. In another example, the change in orientation may be approximately a one degree change in angle or less. The amount of change in orientation and/or the length of the change in orientation detected may be varied according to the design criteria of a particular implementation.

In one example, the ego vehicle 50 may drive over the speed bump 280*a*. When the ego vehicle 50 drives over the speed bump 280*a*, the sensors 114*i*-114*k* may detect the change in orientation. The change in orientation caused by the front of the ego vehicle 50 driving over the speed bump 280*a* may be a change in the pitch rotation 394. For example, as the front wheels drive over the speed bump 280*a*, the front end of the ego vehicle 50 may raise upwards slightly. After the ego vehicle 50 drives over the speed bump 280*a*, the pitch rotation 394 may return to the previous amount (e.g., rotate back down to the angle of the road).

In one example, the ego vehicle 50 may drive over the pothole 280*b*. When the ego vehicle 50 drives over the pothole 280*b*, the sensors 114*i*-114*k* may detect the change in orientation. The change in orientation caused by the front of the ego vehicle 50 driving over the pothole 280*b* may be a change in the roll rotation 392. For example, the pothole 280*b* may affect one wheel but not the other. As one of the front wheels drive over the pothole 280*b*, one side of the ego vehicle 50 may dip downwards slightly (e.g., the front driver side tire may sink into the pothole while the front passenger side tire may remain on the flat road surface). After the ego vehicle 50 drives over the pothole 280*b*, the roll rotation 392 may return to the previous amount (e.g., the tire returns form the pothole 280*b* to the angle of the road).

In one example, the ego vehicle 50 may drive down a declined roadway (e.g., a downward slope). When the ego vehicle 50 drives down the slope, the sensors 114*i*-114*k* may detect the change in orientation. The change in orientation caused by the ego vehicle 50 driving down a slope may be a change in the pitch rotation 394. For example, the downward slope may cause the entire ego vehicle 50 to be angled downwards. Furthermore, the change in orientation may be an acceleration on the vertical axis 386 (e.g., moving down in elevation). After the ego vehicle 50 drives down the slope, the pitch rotation 394 may return to the previous amount and ego vehicle 50 may be at a lower position along the vertical axis 386 (e.g., at a lower elevation).

After the change in orientation has been detected by the processors 106a-106n, the processors 106a-106n may perform the computer vision operations on the video frames captured by the capture devices 102a-102n (e.g., generally the front facing capture device 102e may capture the obstacles 280a-280b that the ego vehicle 50 has driven over). The computer vision operations may be performed on the video frames captured prior to detecting the change in orientation of the ego vehicle 50. The video frames captured before the ego vehicle 50 has had the change in orientation may comprise the object that caused the change in orientation as the object approached the ego vehicle 50. Generally, the video frames captured after the change in orientation may not comprise pixel data that corresponds to the obstacles 280a-280b (e.g., the ego vehicle has driven past the obstacles 280a-280b and the obstacles 280a-280b would not be within the field of view 208a-208b of the front capture device 102e).

In some embodiments, the processors 106a-106n may perform the computer vision operations on the video frames captured by a rear-facing capture device (e.g., the video frames captured in the field of view 206a-206b of the rear capture device 102c) after the change in orientation of the ego vehicle 50 has been detected. The video frames captured by the capture devices 102a-102n that are rear-facing may capture a view of the obstacles 280a-280b as the ego vehicle 50 drives away from the obstacles 280a-280b (e.g., after driving over the obstacles 280a-280b). The processors 106a-106n may perform the annotations on the video frames of the obstacles 280a-280b captured from the rear-facing capture devices to provide the CNN module 150' with the training data. The annotations may provide information that indicates the obstacles 280a-280b have been detected from the rear-facing capture device 102c to enable the CNN module 150' to distinguish between differences in the obstacles 280a-280b that may exist when viewed from a different perspective (e.g., the speed bump 280a may appear differently when being approached by the ego vehicle 50 compared to when the ego vehicle 50 is driving away from the speed bump 280a). In an example, the speed bump 280a may have reflective paint on one side as a warning for approaching vehicles, but the other side may not use the reflective paint (e.g., since drivers generally would not be driving over the speed bump 280a in reverse).

In some embodiments, the sensors 114i-114k may implement gyroscopes with integrated accelerometers. In an example, the sensors 114i-114k may be a 6-axis motion tracking device configured as a 3-axis gyroscope and a 3-axis accelerometer in the same sensor package (e.g., same silicon die). The sensors 114i-114k may be configured to provide data for features such as navigation, imaging, augmented reality and/or determining orientation. The sensors 114i-114k may be configured to output digital output X-, Y-, and Z-axis angular rate sensors (e.g., gyroscope functionality to determine the roll 392 rotation, the pitch rotation 394 and the yaw rotation 396). The sensors 114i-114k may be configured to output digital output X-, Y-, and Z-axis accelerometer (e.g., with a programmable full scale range of ±2 g, ±4 g, ±8 g and ±16 g to determine an amount of acceleration along the longitudinal axis 382, the transverse axis 384 and the vertical axis 386). The combination of data about the change in rotation and/or change in acceleration may be used by the processors 106a-106n to determine the change in orientation of the ego vehicle 50.

Figure 6:
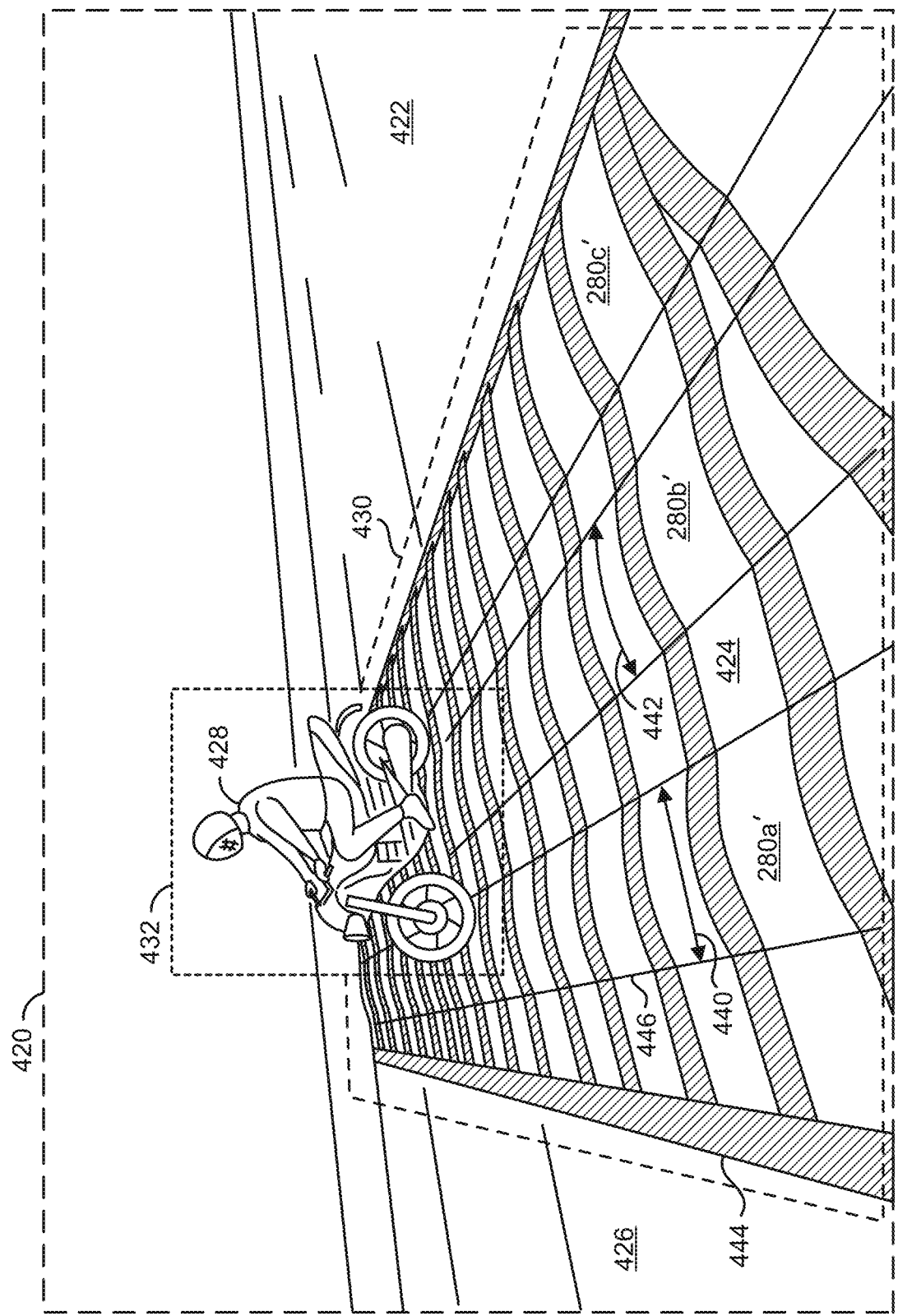
FIG. 6 is a diagram illustrating an example video frame of speed bumps.

Referring to FIG. 6, a diagram illustrating an example video frame of speed bumps is shown. An example video frame 420 is shown. The example video frame 420 may comprise pixel data captured by one or more of the capture devices 102a-102n. In one example, the video frame 420 may be provided to the processor 106a-106n as the signal FRAMES_A-FRAMES_N. In another example, the video frame 420 may be generated by the processors 106a-106n in response to the pixel data provided in the signal FRAMES_A-FRAMES_N. The pixel data may be received by the processors 106a-106n and video processing operations may be performed by the video processing pipeline 156 to generate the example video frame 420. In some embodiments, the example video frame 420 may be presented as human viewable video output to one or more of the displays 118a-118n. In some embodiments, the example video frame 420 may be utilized internal to the processor 106a-106n to perform the computer vision operations.

The example video frame 420 may comprise a portion of a roadway 422, a portion of a roadway 424 and a portion of a roadway 426. The portion of the roadway 422 may be a section of road before a speed bump, the portion of the roadway 424 may be a speed bump portion and the portion of the roadway 426 may be a section of road after a speed bump. The speed bump portion 424 may comprise a number of speed bumps 280a'-280c'.

A vehicle 428 is shown traveling on the speed bump portion 424. In the example shown, the vehicle 428 may be a motorcycle. The motorcycle 428 is shown traveling on the speed bump portion 424 and towards the roadway portion 426.

In the example shown, the example video frame 420 may capture a view from the perspective of a side of the ego vehicle 50. For example, the capture device 102i that captures the pixel data for the example video frame 420 may implement the lens 112i mounted on a passenger side of the ego vehicle 50 that captures a view to the right of the ego vehicle 50. The ego vehicle 50 may be traveling in the same direction as the motorcycle 428. For example, the ego vehicle 50 may have previously been on the roadway portion 422, may be currently on the speed bump portion 424 and may be driving towards (or partially on) the roadway portion 426.

A dotted shape 430 is shown. The dotted shape 430 may represent the detection of objects by the computer vision operations performed by the processors 106a-106n. The dotted shape 430 may comprise the pixel data corresponding to an object detected by the computer vision operations pipeline 162 and/or the CNN module 150. The object 430 detected may be the speed bumps 280a'-280c'.

A dotted shape 432 is shown. The dotted shape 432 may represent the detection of objects by the computer vision operations performed by the processors 106a-106n. The dotted shape 432 may comprise the pixel data corresponding to an object detected by the computer vision operations pipeline 162 and/or the CNN module 150. The object 432 detected may be the motorcycle 428.

The computer vision operations may be configured to detect characteristics of the detected objects. In the example video frame 420, characteristics 440-446 of the detected object 430 are shown detected by the processors 106a-106n.

The characteristic 440 is shown represented as a double ended arrow. The characteristic 440 may be a width the speed bump 280a'. The characteristic 442 is shown represented as a curved double ended arrow. The characteristic 442 may be a height or arc length of the speed bump 280b'. The characteristic 444 is shown as reflective paint of the speed bumps 280a'-280c'. The characteristic 446 may represent a paint color of the speed bumps 280a'-280c'. The computer vision operations may further detect characteristics of the motorcycle 428 (e.g., size, shape, angle of orientation, speed, color, make, model, size of person riding, etc.). The types of characteristics detected may be varied according to the design criteria of a particular implementation.

The characteristics of the obstacles 280a'-280c' (and other obstacles 280a-280n, not shown) may be varied. In one example, speed bumps may have different sizes, shapes, colors, etc. In another example, potholes may have different sizes, shapes, depths, etc. The processors 106a-106n may be configured to detect the obstacles 280a-280n (e.g., detecting the object 430 in the example video frame 420). The processors 106a-106n may be configured to annotate that the pixel data in the video frames corresponds to the obstacles 280a-280n. The different characteristics detected and/or annotated may be used as the training data 352a-352n by the CNN module 150'. Providing the training data 352a-352n of various types, shapes, sizes, etc. of the obstacles 280a-280n may enable the CNN module 150' to improve detection of the obstacles 280a-280n.

Generally, the detection of the obstacles 280a-280n may be performed on video frames captured of a view in front of the ego vehicle 50 (e.g., using the front-facing capture device 102c). In some embodiments, video frames captured from alternate views may be used to detect the obstacles 280a-280n. In the example shown, the speed bumps 280a'-280c' are wide enough to extend beyond the ego vehicle 50 (e.g., the speed bumps 280a'-280c' shown extend the width of the roadway) and may be partially underneath the ego vehicle 50 and partially beside the ego vehicle 50. Since the speed bumps 280a'-280c' may be visible using a side view from the ego vehicle 50, the processors 106a-106n may perform the computer video operations on the side view video frame 420 to detect the object 430 and/or the characteristics 440-446.

In some embodiments, the orientation of other objects (such as the object 432) may be used to detect the presence of the obstacles 280a-280n. For example, the processors 106a-106n may detect a change in vertical position of the object 432. The motorcycle object 432 may be at an original vertical position when driving on the roadway portion 422, then change to a higher vertical position when driving on the speed bump portion 424, and then return to the original vertical position when driving on the roadway portion 426. The change in vertical position may be an indication that one of the obstacles 280a-280n is present. In another example, a change in angle of the motorcycle object 432 may indicate the presence of the obstacles 280a-280n. The motorcycle object 432 may have a change in pitch rotation (e.g., the front end of the motorcycle 428 may lift upwards) when crossing from the roadway portion 422 to the speed bump portion 424 and a complimentary change in pitch rotation (e.g., the front end of the motorcycle 428 may drop downwards) when crossing from the speed bump portion 424 to the roadway portion 426. The type of characteristics detected by the processors 106a-106n of other objects to infer the presence of the obstacles 280a-280n may be varied according to the design criteria of a particular implementation.

Referring to FIG. 7, a diagram illustrating an example video frame of approaching a speed bump and an example video frame of traveling over a speed bump is shown. A video frame 520 is shown. The video frame 520 may be captured by one of the capture devices 102a-102n. In the example shown, the video frame 520 may be captured by the front-facing capture device 102c (e.g., the video frame 520 may comprise pixel data of the environment within the field of view 208a-208b). The pixel data may be received by the processors 106a-106n and video processing operations may be performed by the video processing pipeline 156 to generate the example video frame 520. In some embodiments, the example video frame 520 may be presented as human viewable video output to one or more of the displays 118a-118n. In some embodiments, the example video frame 520 may be utilized internal to the processor 106a-106n to perform the computer vision operations.

The example video frame 520 may comprise a roadway 522 and a vehicle 524. For example, the vehicle 524 may be traveling in front of the ego vehicle 50 on the roadway 522. The vehicle 524 may be one of the objects detected by the computer vision operations performed by the processors 106a-106n.

The speed bump 280a is shown on the roadway 522. A dotted box 530 may represent the computer vision operations performed by the processors 106a-106n detecting the speed bump 280a. The processors 106a-106n may detect the object 530 that corresponds to the speed bump 280a and detect characteristics of the speed bump 280a. A double ended arrow 532 is shown. The double ended arrow 532 may represent a height characteristic of the speed bump 280a. Other characteristics may be detected (e.g., length, width, color, reflective paint, etc.).

Dotted boxes 534a-534d are shown on the vehicle 524. The dotted boxes 534a-534d may represent characteristics of the vehicle 524. In the example shown, the characteristics 534a-534d may be corner locations on the vehicle 524. The arrangement of the corner locations 534a-534d may correspond to an orientation of the vehicle 524 with respect to the ego vehicle 50. The corner locations 534a-534d may represent reference points of the object. In the example shown, the corner location 534a may correspond to a driver side tail light of the vehicle 524, the corner location 534b may correspond to a passenger side tail light of the vehicle 524, the corner location 534c may correspond to a driver side bumper of the vehicle 524 and the corner location 534d may correspond to a passenger side bumper of the vehicle 524.

A dotted line 536 and a dotted line 538 are shown horizontally across the example video frame 520. The dotted line 536 may be aligned with the corner locations 534a-534b. The dotted line 538 may be aligned with the corner locations 524c-524d. The lines 536-538 may be shown to illustrate a general location of the corner locations 534a-534d with respect to the example video frame 520. The reference lines 536-538 may represent the processors 106a-106n monitoring the detected object(s) in the video frame. In the example shown, the reference line 536 may be located on a top half of the example video frame 520 and the reference line 538 may be located across the middle of the video frame 520. The reference lines 536-538 may have a horizontal orientation that indicates that the corner locations 534a-534b may be horizontally aligned and the corner locations 534c-534d may be horizontally aligned.

An example video frame 550 is shown. The example video frame 550 may be similar to the example video frame 520 (e.g., captured by the same capture device 102c, correspond to the same field of view 208a-208b, captured close to the same time as the video frame 520, etc.). The example video frame 550 may be a video frame captured at a later time than the video frame 520. For example, the processors 106a-106n may generate and perform computer vision operations on a sequence of video frames and the video frame 520 may be a video frame captured earlier in the sequence than the video frame 550.

The example video frame 550 may be captured at a time when the ego vehicle 50 is driving over the speed bump 280a. Since the speed bump 280a may be under the tires of the ego vehicle 50, the speed bump 280a may not be visible in the video frame 550. Since the ego vehicle 50 is driving over the speed bump 280a, the ego vehicle 50 may have a change in the pitch rotation 394. For example, the front end of the ego vehicle 50 may be angled upwards as the front tires drive over the speed bump 280a. The computer vision operations performed by the processors 106a-106n may detect and/or infer the change in orientation by comparing the pixel data of the video frame 550 with pixel data of the video frame 520.

The video frame 550 may comprise the roadway 522', the vehicle 524', the corner locations 534a'-534d', the reference line 536' and the reference line 538'. The roadway 522', the vehicle 524', the corner locations 534a'-534d', the reference line 536' and the reference line 538' may each be detected similarly in the video frame 550 by the processors 106a-106n as detected in the video frame 520. However, the general location of the roadway 522', the vehicle 524', the corner locations 534a'-534d', the reference line 536' and the reference line 538' on the video frame 550 may be different compared to the video frame 520. The disparity engine 164 may be configured to detect changes in positions of the objects and/or characteristics of the objects detected between the video frame 520 and the video frame 550. The disparity engine 164 may detect subtle changes in location of objects and/or characteristics to determine whether a change in orientation has occurred.

The disparity engine 164 may compare the location of the corner locations 534a-534d with respect to the video frame 520 to the location of the corner locations 534a'-534d' with respect to the video frame 550. In the example shown, the corner locations 534a'-534d' are in a lower portion of the video frame 550 compared to the corner locations 534a-534d. For example, the reference line 536 passing through the corner locations 534a-534b is in the upper portion of the video frame 520 while the reference line 536' passing through the corner locations 534a'-534b' is in the lower portion of the video frame 550. Similarly, the reference line 538 passing through the corner locations 534c-534d is in the middle of the video frame 520 while the reference line 538' passing through the corner locations 534c'-534d' is near the bottom of the video frame 550. Based on the change in location of the reference points 534a'-534d' detected by the disparity engine 164, the decision module 158 may determine that the truck 524' has moved lower in the video frame 550 compared to the location of the truck 524 in the previously captured video frame 520. In the example shown, the disparity engine 164 may compare locations of objects and/or characteristics or objects between two video frames. However, the disparity engine 164 may analyze any number of video frames in a sequence of video frames.

A dotted box 552 is shown on the video frame 550. The dotted box 552 may represent a newly visible section of the truck 524'. The newly visible section 552 may be a portion of the video frame 550 that comprises pixel data that is not visible in the previously captured video frame 520. For example, in the video frame 520, the field of view 208a-208b of the capture device 102c may extend as far upwards as the exhaust pipes of the truck 524 and extend downwards to show the roadway 522. In the example video frame 550, the field of view 208a-208b of the capture device 102c may extend farther upwards to show the exhaust smoke coming out of the exhaust pipes (e.g., an area above the truck 524') and extend less downwards to show less of the roadway 522' (e.g., and cut off the tires of the truck 524' from view). The field of view 208a-208b may be the same size in the video frame 520 and the video frame 550. However, the field of view 208a-208b may capture a higher section of the environment in the video frame 550 compared to the video frame 520. The higher section of the environment in the video frame 550 may reveal the newly visible section 552 above the truck 524', while not capturing pixel data of a section below the truck 524'.

Based on the relative change in location of the pixel data between the video frame 550 and the video frame 520 and/or the newly visible pixel data 552 at a top of the video frame 550, the processors 106a-106n may determine that the ego vehicle 50 may have a change in angle. The change in angle may correspond to a front end of the ego vehicle 50 being raised upwards (e.g., an increase in the pitch rotation 394). The change in the pitch rotation 394 may be an indication of the change in orientation of the ego vehicle 50. By detecting the change in the pitch rotation 394 by comparing video frames of a sequence of video frames, the processors 106a-106n may detect (e.g., by inference) the change in orientation of the ego vehicle 50 using the computer vision operations. In some embodiments, the processors 106a-106n may detect the change in orientation using the computer vision operations. In some embodiments, the processors 106a-106n may detect the change in orientation using a combination of the computer vision operations and the sensor data from the sensors 114i-114k.

When the ego vehicle 50 drives over the speed bump 280a, the increase in the pitch rotation 394 may be temporary. For example, when the ego vehicle 50 is driving towards the speed bump 280a, the pitch rotation 394 may be an original value (e.g., 0 degrees or rotation). Then when the ego vehicle 50 drives over the speed bump 280a, the pitch rotation 394 may increase (e.g., to 10 degrees of rotation). After the ego vehicle 50 drives over the speed bump 280a, the pitch rotation 394 may return to the original value. A quick change in orientation then a quick change back may be an indication of the speed bump 280a.

When the decision module 158 detects the presence of the speed bump 280a (e.g., based on the computer vision operations performed to detect the change in orientation by comparing the disparity between the video frame 550 and the video frame 520 and/or by reading the sensors 114i-114k), the processors 106a-106n may refer back to video frames captured earlier to detect the pixel data that corresponds with the speed bump 280a (e.g., a cause of the change in orientation). For example, the CNN module 150 may not detect the object 530 as the speed bump 280a until the change in orientation of the ego vehicle 50 is detected at a later time (e.g., when the video frame 550 is captured and analyzed).

In some embodiments, a library of objects used by the CNN module 150 may not include information for detecting the speed bump 280a. Detecting the change in orientation of the ego vehicle 50 may provide a hint to the processors 106a-106n that pixel data in previously captured video frames may comprise the speed bump 280a. The processors 106a-106n may search backwards temporally through the sequence of video frames captured for pixel data on the roadway 522 that may correspond to the speed bump 280a based on the hint provided by the change in orientation. The CNN module 150 may analyze the video frames (including the video frame 520) and determine that the pixel data in the region 530 of the video frame 520 may be the speed bump 280a. The CNN module 150 may generate a confidence level that indicates a likelihood that the pixel data in the region 530 could be the cause of the change in orientation (e.g., the speed bump 280a). If the confidence level is above a pre-determined threshold, then the decision module may determine that the object 530 is the speed bump 280a that eventually caused the change in orientation of the ego vehicle 50 at a later time when the video frame 550 was captured.

The processors 106a-106n may generate annotations for the video frame 520 in response to detecting the speed bump 280a. The annotations may provide data about the pixel data in the region 530 that corresponds to the speed bump 280a. The annotations and the video frame 520 may be communicated to the central CNN module 150'. The annotations corresponding to the speed bump 280a and the video frame 520 may provide training data to the central CNN module 150'. The training data may be used to generate libraries for the apparatus 100 that may detect the speed bump 280a.

Referring to FIG. 8, a diagram illustrating an example video frame of approaching a pothole and an example video frame of traveling over a pothole is shown. A video frame 580 is shown. The video frame 580 may be captured by one of the capture devices 102a-102n. In the example shown, the video frame 580 may be captured by the front-facing capture device 102c (e.g., the video frame 580 may comprise pixel data of the environment within the field of view 208a-208b). The pixel data may be received by the processors 106a-106n and video processing operations may be performed by the video processing pipeline 156 to generate the example video frame 580. In some embodiments, the example video frame 580 may be presented as human viewable video output to one or more of the displays 118a-118n. In some embodiments, the example video frame 580 may be utilized internal to the processor 106a-106n to perform the computer vision operations.

The example video frame 580 may comprise a roadway 582 and a vehicle 584. For example, the vehicle 584 may be traveling in front of the ego vehicle 50 on the roadway 582. The vehicle 584 may be one of the objects detected by the computer vision operations performed by the processors 106a-106n.

The pothole 280b is shown on the roadway 582. A dotted box 590 may represent the computer vision operations performed by the processors 106a-106n detecting the pothole 280b. The processors 106a-106n may detect the object 590 that corresponds to the pothole 280b and detect characteristics of the pothole 280b. A characteristic 592 of the pothole 280b is shown. The characteristic 592 of the pothole 280b may represent a depth of the pothole 280b, a shape of the pothole 280b, a color of the pothole 280b (e.g., to indicate the pothole 280b is filled with water, with mud, etc.), etc.

Dotted boxes 594a-594d are shown on the vehicle 584. The dotted boxes 594a-594d may represent characteristics of the vehicle 584. In the example shown, the characteristics 594a-594d may be corner locations on the vehicle 584. The arrangement of the corner locations 594a-594d may be reference points that correspond to an orientation of the vehicle 584 with respect to the ego vehicle 50. In the example shown, the corner location 594a may correspond to a driver side tail light of the vehicle 584, the corner location 594b may correspond to a passenger side tail light of the vehicle 584, the corner location 594c may correspond to a driver side bumper of the vehicle 584 and the corner location 594d may correspond to a passenger side bumper of the vehicle 584.

A dotted line 596 and a dotted line 598 are shown horizontally across the example video frame 580. The dotted line 596 may be aligned with the corner locations 594a-594b. The dotted line 598 may be aligned with the corner locations 594c-594d. The lines 596-598 may be shown to illustrate a general location of the corner locations 594a-594d with respect to the example video frame 580. The reference lines 596-598 may represent the processors 106a-106n monitoring the detected object(s) in the video frame. In the example shown, the reference line 596 may be located on a top half of the example video frame 580 and the reference line 598 may be located across the middle of the video frame 580. The reference lines 596-598 may have a horizontal orientation that indicates that the corner locations 594a-594b may be horizontally aligned and the corner locations 594c-594d may be horizontally aligned.

An example video frame 610 is shown. The example video frame 610 may be similar to the example video frame 580 (e.g., captured by the same capture device 102c, correspond to the field of view 208a-208b, captured close to the same time as the video frame 580, etc.). The example video frame 610 may be a video frame captured at a later time than the video frame 580. For example, the processors 106a-106n may generate and perform computer vision operations on a sequence of video frames and the video frame 580 may be a video frame captured earlier in the sequence than the video frame 610.

The example video frame 610 may be captured at a time when the ego vehicle 50 is driving over the pothole 280b. Since the pothole 280b may be under the tires of the ego vehicle 50, the pothole 280b may not be visible in the video frame 610. Since the ego vehicle 50 is driving over the pothole 280b, the ego vehicle 50 may have a change in the roll rotation 392. For example, the front passenger side of the ego vehicle 50 may be angled downwards and the front driver side tire may remain on the roadway 582 as the front passenger tire drives into the pothole 280b (e.g., causing one side of the ego vehicle 50 to dip down). The computer vision operations performed by the processors 106a-106n may detect and/or infer the change in orientation by comparing the pixel data of the video frame 610 with pixel data of the video frame 580.

The video frame 610 may comprise the roadway 582', the vehicle 584', the corner locations 594a'-594d', the reference line 596' and the reference line 598'. The roadway 582', the vehicle 584', the corner locations 594a'-594d', the reference line 596' and the reference line 598' may each be detected similarly in the video frame 610 by the processors 106a-106n as detected in the video frame 580. However, the general location of the roadway 582', the vehicle 584', the corner locations 594a'-594d', the reference line 596' and the reference line 598' on the video frame 610 may be different compared to the video frame 580. The disparity engine 164 may be configured to detect changes in positions of the objects and/or characteristics of the objects detected between the video frame 580 and the video frame 610. The disparity engine 164 may detect subtle changes in location of objects and/or characteristics to determine whether a change in orientation has occurred.

The disparity engine 164 may compare the location of the corner locations 594a-594d with respect to the video frame 580 to the location of the corner locations 594a'-594d' with respect to the video frame 610. In the example shown, the corner locations 594a'-594d' are skewed in the video frame 610 compared to the corner locations 594a-594d. For example, the reference line 596 passing through the corner locations 594a-594b is in a horizontal orientation on the upper portion of the video frame 580 while the reference line 596' passing through the corner locations 594a'-594b' is on an angle from the top left towards the middle right of the video frame 610. Similarly, the reference line 598 passing through the corner locations 594c-594d is in a horizontal orientation on the middle of the video frame 580 while the reference line 598' passing through the corner locations 594c'-594d' is on an angle from the middle left towards the bottom right of the video frame 610. Based on the change in location of the reference points 594a'-594d' detected by the disparity engine 164, the decision module 158 may determine that the truck 584' has been tilted (or skewed, or rolled) in the video frame 610 compared to the location of the truck 584 in the previously captured video frame 580. In the example shown, the disparity engine 164 may compare locations of objects and/or characteristics or objects between two video frames. However, the disparity engine 164 may analyze any number of video frames in a sequence of video frames.

A dotted box 612 is shown on the video frame 610. The dotted box 612 may represent a newly visible section of the truck 584'. The newly visible section 612 may be a portion of the video frame 610 that comprises pixel data that is not visible in the previously captured video frame 580. For example, in the video frame 580, the field of view 208a-208b of the capture device 102c may extend as far upwards as the exhaust pipes of the truck 584 and extend downwards to show the roadway 582. In the example video frame 610, the field of view 208a-208b of the capture device 102c may be angled and show more of the exhaust pipes (e.g., an area above the truck 584'). The field of view 208a-208b may be the same size in the video frame 580 and the video frame 610. However, the field of view 208a-208b may comprise a skewed perspective of the environment in the video frame 610 compared to the video frame 580. The skewed perspective of the environment in the video frame 610 may reveal the newly visible section 612 of the truck 584', while not capturing pixel data from other areas of the video frame 610.

Based on the relative change in location of the pixel data between the video frame 610 and the video frame 580 and/or the newly visible pixel data 612 at a top of the video frame 610, the processors 106a-106n may determine that the ego vehicle 50 may have a change in angle. The change in angle may correspond to one side of a front end of the ego vehicle 50 dropping downwards (e.g., a decrease in the roll rotation 392). The change in the roll rotation 392 may be an indication of the change in orientation of the ego vehicle 50. By detecting the change in the roll rotation 392 by comparing video frames of a sequence of video frames, the processors 106a-106n may detect (e.g., by inference) the change in orientation of the ego vehicle 50 using the computer vision operations. In some embodiments, the processors 106a-106n may detect the change in orientation using the computer vision operations. In some embodiments, the processors 106a-106n may detect the change in orientation using a combination of the computer vision operations and the sensor data from the sensors 114i-114k.

When the ego vehicle 50 drives over the pothole 280b, the decrease in the roll rotation 392 may be temporary. For example, when the ego vehicle 50 is driving towards the pothole 280b, the roll rotation 392 may be an original value (e.g., 0 degrees or rotation). Then when the ego vehicle 50 drives into the pothole 280b, the roll rotation 392 may decrease (e.g., to −5 degrees of rotation). After the ego vehicle 50 drives out of the pothole 280b, the roll rotation 392 may return to the original value. A quick change in orientation then a quick change back may be an indication of the pothole 280b.

When the decision module 158 detects the presence of the pothole 280b (e.g., based on the computer vision operations performed to detect the change in orientation by comparing the disparity between the video frame 610 and the video frame 580 and/or by reading the sensors 114i-114k), the processors 106a-106n may refer back to video frames captured earlier to detect the pixel data that corresponds with the pothole 280b (e.g., a cause of the change in orientation). For example, the CNN module 150 may not detect the object 590 as the pothole 280b until the change in orientation of the ego vehicle 50 is detected at a later time (e.g., when the video frame 610 is captured and analyzed).

In some embodiments, a library of objects used by the CNN module 150 may not include information for detecting the pothole 280b. Detecting the change in orientation of the ego vehicle 50 may provide a hint to the processors 106a-106n that pixel data in previously captured video frames may comprise the pothole 280b. The processors 106a-106n may search backwards temporally through the sequence of video frames captured for pixel data on the roadway 582 that may correspond to the pothole 280b based on the hint provided by the change in orientation. The CNN module 150 may analyze the video frames (including the video frame 580) and determine that the pixel data in the region 590 of the video frame 580 may be the pothole 280b. The CNN module 150 may generate a confidence level that indicates a likelihood that the pixel data in the region 590 could be the cause of the change in orientation of the ego vehicle 50 (e.g., the pothole 280b). If the confidence level is above a predetermined threshold, then the decision module may determine that the object 590 is the pothole 280b that eventually caused the change in orientation of the ego vehicle 50 at a later time when the video frame 610 was captured.

The processors 106a-106n may generate annotations for the video frame 580 in response to detecting the pothole 280b. The annotations may provide data about the pixel data in the region 590 that corresponds to the pothole 280b. The annotations and the video frame 580 may be communicated to the central CNN module 150'. The annotations corresponding to the pothole 280b and the video frame 580 may provide training data to the central CNN module 150'. The training data may be used to generate libraries for the apparatus 100 that may detect the pothole 280b.

Referring to FIG. 9, a diagram illustrating example video frames of a sloped road and readings from a gyroscope is shown. A video frame 640 is shown. The video frame 640 may be captured by one of the capture devices 102a-102n. In the example shown, the video frame 580 may be captured by one of the capture devices 102a-102n that is directed outwards from a passenger side of the ego vehicle 50 (e.g., similar to the example video frame 420 shown in association with FIG. 6). The pixel data may be received by the processors 106a-106n and video processing operations may be performed by the video processing pipeline 156 to generate the example video frame 640. In some embodiments, the example video frame 640 may be presented as human viewable video output to one or more of the displays 118a-118n. In some embodiments, the example video frame 640 may be utilized internal to the processor 106a-106n to perform the computer vision operations.

The video frame 640 may comprise buildings 642, a road 644 and cars 646a-646b. The buildings 642, the road 644 and/or the cars 646a-646b may be examples of objects detected by the CNN module 150. The processors 106a-106n may perform the computer vision operations on the characteristics of the buildings 642, the road 644 and/or the cars 646a-646b to determine the orientation of the ego vehicle 50.

In the example video frame 640, the characteristics of the buildings 642, the road 644 and/or the cars 646a-646b may provide potentially misleading information. The road 644 is shown relatively straight in a horizontal orientation. The buildings 642 are shown at an angle. The cars 646a-646b are shown relatively straight and horizontally level with the road 644. The computer vision operations alone may have difficulty interpreting the scene in the video frame 640.

The sensor 114i is shown. Arrows 650a-650n are shown to represent a reading from the gyroscope 114i. The arrows 650a-650b are shown at an angle (e.g., not horizontally and vertically oriented). The readings 650a-650b may indicate that the ego vehicle 50 is not on a level surface. The readings 650a-650b from the gyroscope 114i may provide information that indicates that the ego vehicle 50 is on a sloped road.

In an example, when the ego vehicle 50 is driving downwards on a sloped road (e.g., angled downwards with a negative pitch rotation 394), the lenses 112a-112n attached to the ego vehicle 50 may also have a change in angle. The change in angle of the lenses 112a-112n may cause the sloped road 644 to appear level because the angle of the lenses 112a-112n may have changed in union with the slope of the road 644 (e.g., unless the lenses 112a-112n are implemented using a gimbal). Since the lenses 112a-112n may have rotated corresponding to the pitch of the road 644, the video frames captured by the lenses 112a-112n may appear level with the road 644 even though the road 644 is sloped.

A corrected video frame 660 is shown. The computer vision operations performed by the processors 106a-106n may be configured to digitally pan, zoom, tilt, rotate, dewarp, etc. the video frame 640. The corrected video frame 660 may be digitally manipulated to correct the perspective of the video frame 640 based on the readings 650a-650b output by the gyroscope 114i. The gyroscope 114i with the adjustment 650a'-650b' is shown to indicate the re-alignment of the video frame 640 to generate the corrected video frame 660.

In the corrected video frame 660, the buildings 642' are shown level horizontally. In the corrected video frame 660, the road 644' and the cars 646a'-646b' are shown sloped downwards to show the actual slope of the road 644'. The readings 650a-650b may provide sensor data that indicates that a change in orientation of the ego vehicle 50 has occurred. The computer vision operations may be used to confirm that the readings 650a-650b from the gyroscope 114i have properly indicated the change in pitch rotation 394 of the ego vehicle 50 (e.g., increase a confidence level of the determination of the change in orientation of the ego vehicle 50). Other vehicle systems may be used to increase the confidence level of the change in orientation of the ego vehicle 50. In an example, one or more of the capture devices 102a-102n may be implemented as stereo camera pairs configured to accurately detect a 3D shape of the road. In another example, one or more of the sensors 114a-114n may implement a 3D depth sensor and/or proximity sensor to detect the shape of the road. The sensor fusion module 152 may be configured to combine the information from disparate sources to provide additional data points that may be used to confirm that the change in orientation of the ego vehicle (e.g., caused by the road slope) has been accurately detected.

In response to detecting the change in orientation of the ego vehicle 50, the processors 106a-106n may have a hint that the road 644 is sloped. The processors 106a-106n may analyze the video frames generated from the pixel data FRAMES_A-FRAMES_N (e.g., video frames captured by any of the capture devices 102a-102n) to detect characteristics and/or pixel data that provide indications that the roadway is sloped. For example, the video frames generated by the front capture device 102c may be analyzed for characteristics that may be used to indicate that the roadway 644 is sloped. When the ego vehicle 50 is angled downwards because the ego vehicle 50 is entirely on a sloped road, without the prior knowledge that the road 644 is sloped from the sensors 114i-114k, detecting the slope of the road 644 may be difficult. The features and/or characteristics of objects detected in the video frames may be annotated by the processors 106a-106n. The annotated video frames may be uploaded to the central CNN module 150' to be used as training data to detect sloped roads.

The apparatus 100 may implement various methods of detecting the change in orientation of the ego vehicle 50. The various methods may be adapted to different types of changes in orientation (e.g., a temporary bump caused by the speed bump 280a, the temporary dip caused by the pothole 280b, the entire change of pitch rotation 394 caused by driving up/down a slope, acceleration changes, etc.). In some embodiments, the gyroscopes 114i-114k may be implemented to detect the change in orientation. In some embodiments, the computer vision operations may analyze the visual content of the video frames to detect the change in orientation (e.g., indications that the ego vehicle 50 has gone up and down).

Figure 10:
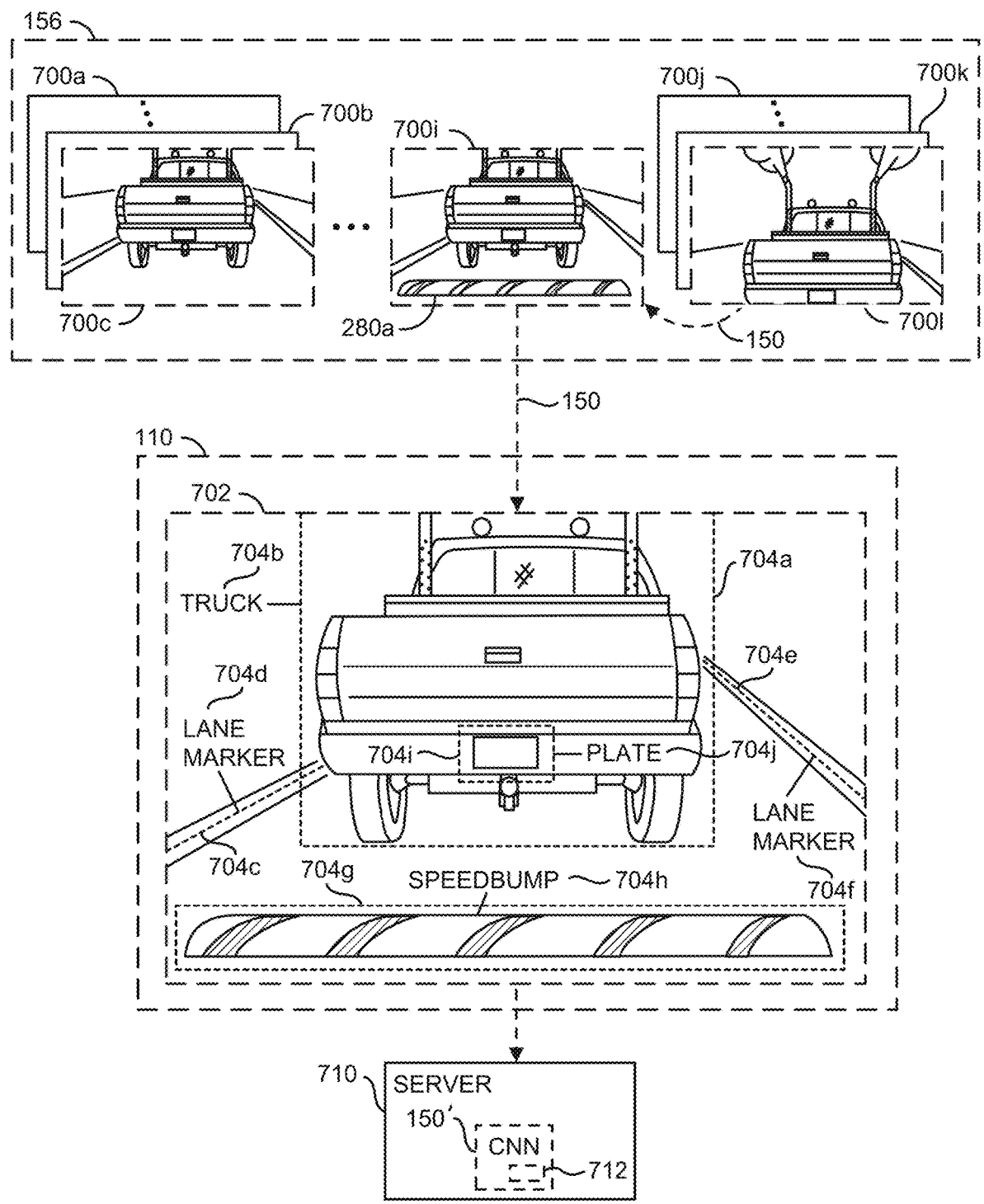
FIG. 10 is a diagram illustrating an example of generating annotated video frames.

Referring to FIG. 10, a diagram illustrating an example of generating annotated video frames is shown. Example video frames 700a-700l are shown being generated and/or analyzed in the video processing pipeline 156. The video frames 700a-700l may be generated in response to the pixel data received from the capture devices 102a-102n. While example video frames 700a-700l are shown, any number of video frames may be generated by the processors 106a-106n.

The video operations may be performed on the video frames 700a-700l in the video processing pipeline 156. In an example, the video frames 700a-700l may be de-warped, compressed, stitched, packaged for communication to another devices, formatted to fit the displays 118a-118n, etc. Some or all of the video frames 700a-700l may be operated on by the CNN module 150 to enable object detection, object classification and/or to determine characteristics of detected objects. The video frames 700a-700l may be stored in a buffer implemented by the video processing pipeline 156 and/or in the memory 108.

The video frames 700a-700h may comprise video data that does not show any of the obstacles 280a-280n. In the example shown, the video frame 700c may provide video data of a truck similar to the truck 524 shown in association with FIG. 7. The example video frame 700i may provide video data of the truck 524 and the speed bump 280a. In one example, while the video frames 700a-700l are generated in the video processing pipeline 156, the CNN module 150 may not have detected the speed bump 280a. The example video frames 700j-700l may comprise video data after the speed bump 280a has become visible (e.g., video frames captured at a later time than the video frame 700i). For example, the speed bump 280a may or may not be visible in the video frames 700j-700l. The video frame 700l may comprise video data similar to the example video frame 550 shown in association with FIG. 7. The video frame 700l may represent a time that the change in orientation of the ego vehicle 50 has been detected.

The change in orientation of the ego vehicle 50 may be detected at the time when the video frame 700l was captured. In one example, the change in orientation of the ego vehicle 50 may be detected by reading the sensors 114i-114k. In another example, the change in orientation of the ego vehicle 50 may be detected by performing the computer vision operations as described in association with FIG. 7.

In response to detecting the change of orientation of the ego vehicle 50 shown in the example video frame 700l, the processors 106a-106n may perform the computer vision operations on the video frames captured before the video frame 700l. In an example, the CNN module 150 may perform object detection, classification and/or detect characteristics of objects in the video frames 700k-700a. The CNN module 150 may operate on the video frames 700k-700a in the reverse order of when the video frames were captured (e.g., there may be a higher likelihood that the obstacle 280a may be detected in the video frames captured closest to the time that the change in orientation of the ego vehicle 50 was detected). In the example shown, the CNN module 150 may detect the obstacle 280a in the video frame 700i.

The CNN module 150 may be configured to generate an annotated video frame 702. The annotated video frame 702 (or frames) may be generated from the video frame(s) that show the obstacle 280a. In the example shown, the annotated video frame 702 may be generated from the video frame 700i. While one example video frame 700i is shown being used to generate one annotated video frame 702, any number of the video frames 700a-700l that show the obstacle 280a may be annotated by the processors 106a-106n (e.g., multiple annotated video frames 702a-702n may be generated).

The annotated video frame 702 may comprise a number of annotations 704a-704j. The annotations 704a-704j may be added to the video frame 700i by the CNN module 150. The annotations 704a-704j may be configured to describe various regions on the video frame 700i. In the example shown, the annotations 704a-704j may be shown as visual indications displayed on the video frame 700i. The visual indications of the annotations 704a-704j may enable a person to view the annotated video frame 702 and see what the processors 106a-106n has detected. Enabling a person to review the annotations 704a-704j may enable a person to provide feedback on the detections made by the processors 106a-106n (e.g., whether objects have been correctly identified). In some embodiments, the annotations 704a-704j may comprise computer readable information. The computer readable information of the annotations 704a-704j may enable a computer and/or processor (such as the processors 106a-106n) to read the information in the annotations 704a-704j. For example, the central CNN module 150' may read the computer readable information of the annotations 704a-704j in order improve object detection. In some embodiments, the annotations 704a-704j may comprise metadata that may be included (e.g., packaged, transmitted, readable with, etc.) the video data in the annotated video frame 702.

The annotations 704a-704j may comprise indications of what is in the video data. The annotations 704a-704j may indicate what an object is, a class of a detected object, a location of objects, characteristics of objects, how much an object has moved since a previous video frame, etc. In the example shown, the annotations 704a-704j may comprise bounding boxes, line marks and/or labels. The bounding boxes may indicate where an object is located. For example, the bounding boxes may provide X,Y coordinates that indicate each corner of an object. In another example, the bounding boxes may represent a size of the detected objects. The line marks may indicate a direction and/or path of an object. The labels may provide a text-based description. For example, the labels may name the type of object detected. The types of annotations 704a-704j generated may be varied according to the design criteria of a particular implementation. At least one of the annotations 704a-704j may be an indication of what caused the change in orientation of the ego vehicle 50.

In the example shown, the annotation 704a may be a bounding box indicating the location of a truck in the video data. The annotation 704b may be a text label associated with the bounding box 704a (e.g., with the classification of the object 'truck'). In the example shown, the annotation 704c may be a line mark that follows a lane marker. The annotation 704d may be a text label associated with the line marker 704c (e.g., with the classification of the object 'lane marker'). In the example shown, the annotation 704e may be a line mark that follows a lane marker. The annotation 704f may be a text label associated with the line marker 704e (e.g., with the classification of the object 'lane marker'). In the example shown, the annotation 704g may be a bounding box indicating the location of an obstacle in the video data. The annotation 704h may be a text label associated with the bounding box 704g (e.g., with the classification of the object 'speed bump'). In the example shown, the annotation 704i may be a bounding box indicating the location of a license plate of a truck in the video data. The annotation 704j may be a text label associated with the bounding box 704i (e.g., with the classification of the object 'plate'). In some embodiments, the annotations 704a-704j may further comprise an OCR reading of the plate numbers.

While the label 704h for the detected speed bump 704g may provide a classification (e.g., speed bump), other annotations 704a-704j may be associated with the detected speed bump 704g. In one example, one of the annotations 704a-704j may indicate colors of the detected speed bump 704g. In another example, one of the annotations 704a-704j may a height of the detected speed bump 704g. In yet another example, one of the annotations 704a-704j may indicate a width of the detected speed bump 704g. In still another example, one of the annotations 704a-704j may indicate a length of the detected speed bump 704g. The annotation 704g for the speed bump may indicate that the speed bump 280a has been determined by the processors 106a-106n to have caused the change in orientation of the ego vehicle 50.

The processors 106a-106n may provide the annotated video frame 702 to the communication device 110. The communication device 110 may be configured to communicate the annotated video frame 702 (e.g., as a component of the signal COM) to an external location. In some embodiments, the communication device 110 may communicate (e.g., upload) the annotated video frames periodically (e.g., queue up a group of annotated video frames to send at a particular time). In some embodiments, the communication device 110 may stream (e.g., upload) the annotated video frames as new annotated video frames are generated by the processors 106a-106n.

A block (or circuit) 710 is shown. The block 710 may represent a remote device (e.g., a server computer). While one block 710 is shown representing the server computer, the server computer 710 may be implemented across multiple devices (e.g., a distributed/cloud computing service). In an example, the server 710 may comprise memory and/or a processors (or shared memory and/or shared processors). The server 710 may comprise the central CNN module 150'. The central CNN module 150' may comprise a block (or circuit) 712. The block 712 may represent an artificial intelligence model. In an example, the central CNN module 150' and/or the artificial intelligence model may comprise computer readable instructions stored in a memory of the server 710 and/or operated on by one or more processors of the server 710.

The server 710 may receive the annotated video frame 702 from the apparatus 100. While one video frame 702 is shown communicated from one communication device 110, the server 710 may be configured to receive any number of annotated video frames from one or more implementations of the apparatus 100. In an example, multiple vehicles (e.g., a fleet of vehicles similar to the ego vehicle 50) may comprise the apparatus 100, and each apparatus 100 may be configured to provide the annotated video frames to the server 710. The annotated video frame 702 (and other annotated video frames from the fleet of vehicles) may be used as the training data 352a-352n for the central CNN module 150'. The central CNN module 150' may be configured to update (e.g., enhance) the artificial intelligence model 712 in response to the annotated video frames used as the training data 352a-352n. The artificial intelligence model 712 may comprise libraries that may be used to detect various objects. Updating the libraries using the training data 352a-352n may enhance the artificial intelligence model 712.

The central CNN module 150' may be configured to be trained in response to the training data 352a-352n generated by the apparatus 100. The training data 352a-352n may improve the reliability of the artificial intelligence model 712 (e.g., the neural network) used by the central CNN module 150' for the detection of the obstacles 280a-280n. The centralized CNN module 150' may be configured to generate updates for the CNN module 150 used by the processors 106a-106n. Updates to the artificial intelligence model 712 may be used to update the libraries of the CNN model 150 used by the processors 106a-106n. The central CNN module 150' may provide the updated artificial intelligence model 712 to the apparatus 100 (e.g., received by the communication device 110 and loaded into the CNN module 150 of the processors 106a-106n). The updated artificial intelligence model 712 in the CNN model 150 may enable the computer vision operations performed by the processors 106a-106n to predict the bumps caused by the obstacles 280a-280n before the ego vehicle 50 reaches the obstacles 280a-280b. When the prediction is incorrect (e.g., no bump is detected which may indicate that the obstacles 280a-280n have not been properly detected), then the apparatus 100 may provide a false positive (or false negative) reading as feedback to further augment the training data 352a-352n.

Figure 11:
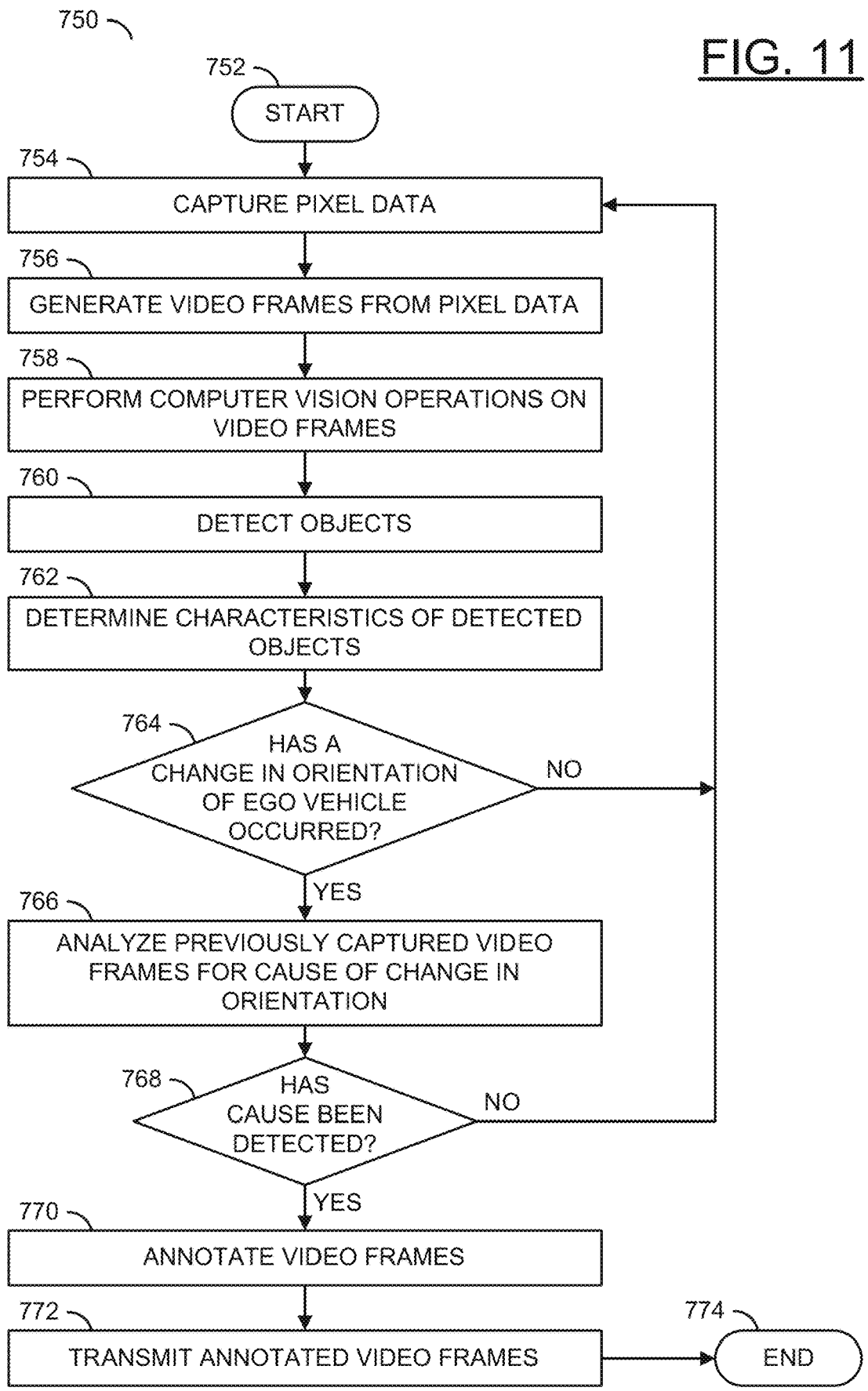
FIG. 11 is a flow diagram illustrating a method for generating annotated video frames.

Referring to FIG. 11, a method (or process) 750 is shown. The method 750 may generate annotated video frames. The method 750 generally comprises a step (or state) 752, a step (or state) 754, a step (or state) 756, a step (or state) 758, a step (or state) 760, a step (or state) 762, a decision step (or state) 764, a step (or state) 766, a decision step (or state) 768, a step (or state) 770, a step (or state) 772, and a step (or state) 774.

The step 752 may start the method 750. In the step 754, the capture devices 102a-102n may capture pixel data in response to the light input IM_A-IM_N received by the lenses 112a-112n. Next, in the step 756, the processors 106a-106n may generate the video frames 700a-700l from the pixel data. In an example, the video processing pipeline 156 may receive the pixel data FRAMES_A-FRAMES_N and convert the pixel data into video frames. In another example, the capture devices 102a-102n may be configured to generate video frames and communicate the video frames FRAMES_A-FRAMES_N to the processors 106a-106n. In the step 758, the CNN module 150 may perform the computer vision operations on the video frames 700a-700l. Next, in the step 760, the CNN module 150 may detect objects (e.g., the detected motorcycle 432, the obstacle 280a, the lane markers, etc.). In the step 762, the CNN module 150 may determine characteristics of the detected objects (e.g., the characteristics 534a-534d of an object). Next, the method 750 may move to the decision step 764.

In the decision step 764, the decision module 158 may determine whether a change in orientation of the ego vehicle 50 has occurred. In an example, the change in orientation may be detected by reading the gyroscope sensors 114i-114k. In another example, the change in orientation may be detected by analyzing the video frames 700a-700l using the computer vision operations. If no change in orientation of the ego vehicle 50 has occurred, the method 750 may return to the step 754. If the change in orientation of the ego vehicle 50 has occurred, then the method 750 may move to the step 766. The change in orientation may be detected at a first time (e.g., a detection time). In the step 766, the CNN module 150 may analyze the previously captured video frames (e.g., video frames captured before the detection time that the change in orientation was detected) for a cause of the change in orientation of the ego vehicle 50. Next, the method 750 may move to the decision step 768.

In the decision step 768, the decision module 158 may determine whether the cause of the change in orientation has been detected. In one example, the computer vision operations may detect the speed bump 280a. In another example, the computer vision operations may detect the pothole 280b. The cause of the change in orientation may be determined by examining a height and/or depth of objects on the roadway 522. If the cause of the change in orientation cannot be detected, then the method 750 may return to the step 754. If the cause of the change in orientation has been detected, then the method 750 may move to the step 770. The object may be detected at a second time (e.g., an object time). The object time when the video frame with the object was captured may be an earlier time than the detection time when the change in orientation was detected.

In the step 770, the CNN module may annotate the video frame (e.g., the video frame 700i) with the annotations 704a-704j to generate the annotated video frames (e.g., the annotated video frame 702). Next, in the step 772, the communication module 110 may transmit the annotated video frames to the remote device 710. Next, the method 750 may move to the step 774. The step 774 may end the method 750.

Figure 12:
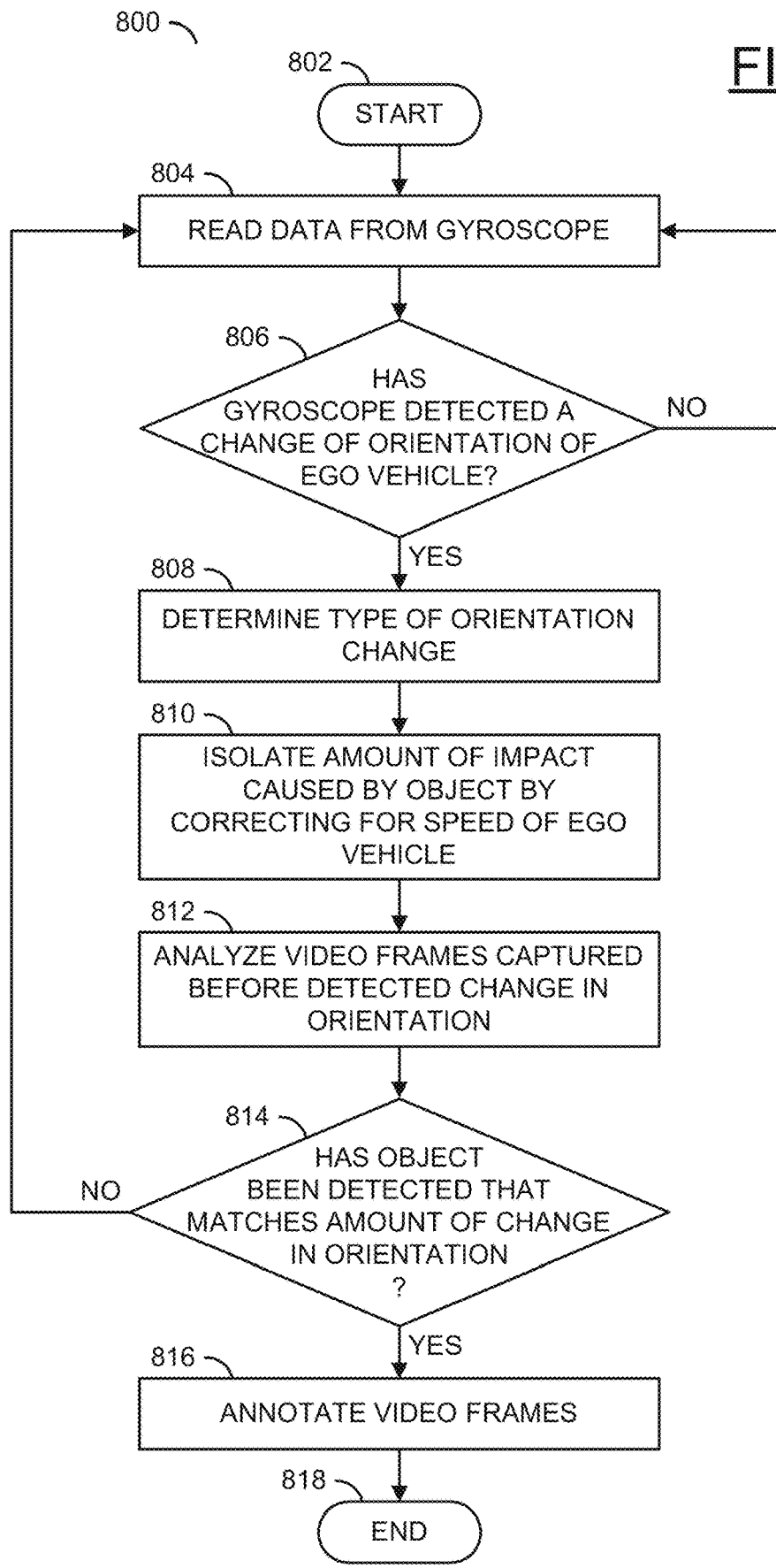
FIG. 12 is a flow diagram illustrating a method for detecting a change in orientation of an ego vehicle using a gyroscope.

Referring to FIG. 12, a method (or process) 800 is shown. The method 800 may detect a change in orientation of an ego vehicle using a gyroscope. The method 800 generally comprises a step (or state) 802, a step (or state) 804, a decision step (or state) 806, a step (or state) 808, a step (or state) 810, a step (or state) 812, a decision step (or state) 814, a step (or state) 816, and a step (or state) 818.

The step 802 may start the method 800. In the step 804, the processors 106a-106n may read data (e.g., the signal SEN) from the gyroscope sensors 114i-114k. Next, the method 800 may move to the decision step 806.

In the decision step 806, the processors 106a-106n may determine whether the gyroscopes 114i-114k have detected a change in orientation of the ego vehicle 50. In one example, the change in orientation may be the roll rotation 392. In another example, the change in orientation may be the pitch rotation 394. In yet another example, the change in orientation may be an acceleration detected along the vertical axis 386. In still another example, the change in orientation may be a combination of detecting rotations along multiple axes and/or detecting accelerations in multiple direction. If the data from the gyroscopes 114i-114k does not indicate a change in orientation of the ego vehicle 50, then the method 800 may return to the step 804. If the data from the gyroscopes 114i-114k does indicate a change in orientation of the ego vehicle 50, then the method 800 may move to the step 808.

In the step 808, the processors 106a-106n may determine the type of change of orientation of the ego vehicle 50. In an example, the type of change in orientation may be a rotation along one or more axes and/or an acceleration in one or more directions. The type of change in orientation may provide a hint as to the type of object to search for to detect the object that caused the change in orientation. Next, in the step 810, the processors 106a-106n may isolate an amount of an impact caused by the object that caused the change in orientation of the ego vehicle 50. For example, the processors 106a-106n may read the speed of the ego vehicle 50 from one of the sensors 114a-114n and correct for the amount of speed that contributed to the impact with the obstacles 280a-280n and the amount of the impact that was caused by the height/depth of the obstacles 280a-280n. In the step 812, the processors 106a-106n may analyze the video frames 7001-700a (e.g., in reverse order, last in first out) that were captured and/or generated before the detected change in orientation. The last in, first out order of the analysis of the video frames 7001-700a to detect the object may be used since there may be a higher likelihood of the object that caused the change in orientation of the ego vehicle 50 being visible in the video frames that were captured just before the change in orientation occurred. Next, the method 800 may move to the decision step 814.

In the decision step 814, the decision module 158 may determine whether any objects have been detected by the CNN module 150 that matches the amount of change in orientation of the ego vehicle 50. In an example, if a large amount of roll rotation 392 has been detected, and no objects have been detected that appear to cause a roll rotation, then no matching object may be detected. In another example, if a large amount of pitch rotation 394 has been detected, and a high speed bump has been detected then the detected object may match the change in orientation. In yet another example, if a small amount of pitch rotation 394 has been detected and a very high object has been detected, the change in orientation may not match (e.g., another object caused the change in orientation and/or the sensors 114a-114n may be providing incorrect readings and need re-calibration). If no object has been found that matches the amount of change in orientation, then the method 800 may return to the step 804. If an object has been detected that matches the change in orientation, then the method 800 may move to the step 816. In the step 816, the processors 106a-106n may generate annotated video frames that have the detected object. Next, the method 800 may move to the step 818. The step 818 may end the method 800.

In some embodiments, one or more of the sensors 114a-114n may be configured to measure a strength of an impact that the ego vehicle 50 has received. The strength of the impact may indicate the height/steepness of the speed bump 280a (or pothole 280b). For example, the processors 106a-106n may be configured to measure a speed of the ego vehicle 50 (e.g., read from one or more of the sensors 114a-114n implementing a speedometer and/or accelerometer via the CAN bus) and correct for the speed of the ego vehicle 50 to determine the amount of the impact caused by the obstacles 280a-280n. By correcting for the speed of the ego vehicle 50, the processors 106a-106n may isolate the amount of impact caused by the speed of the ego vehicle 50 from the amount of impact caused by the height of the obstacles 280a-280n.

Figure 13:
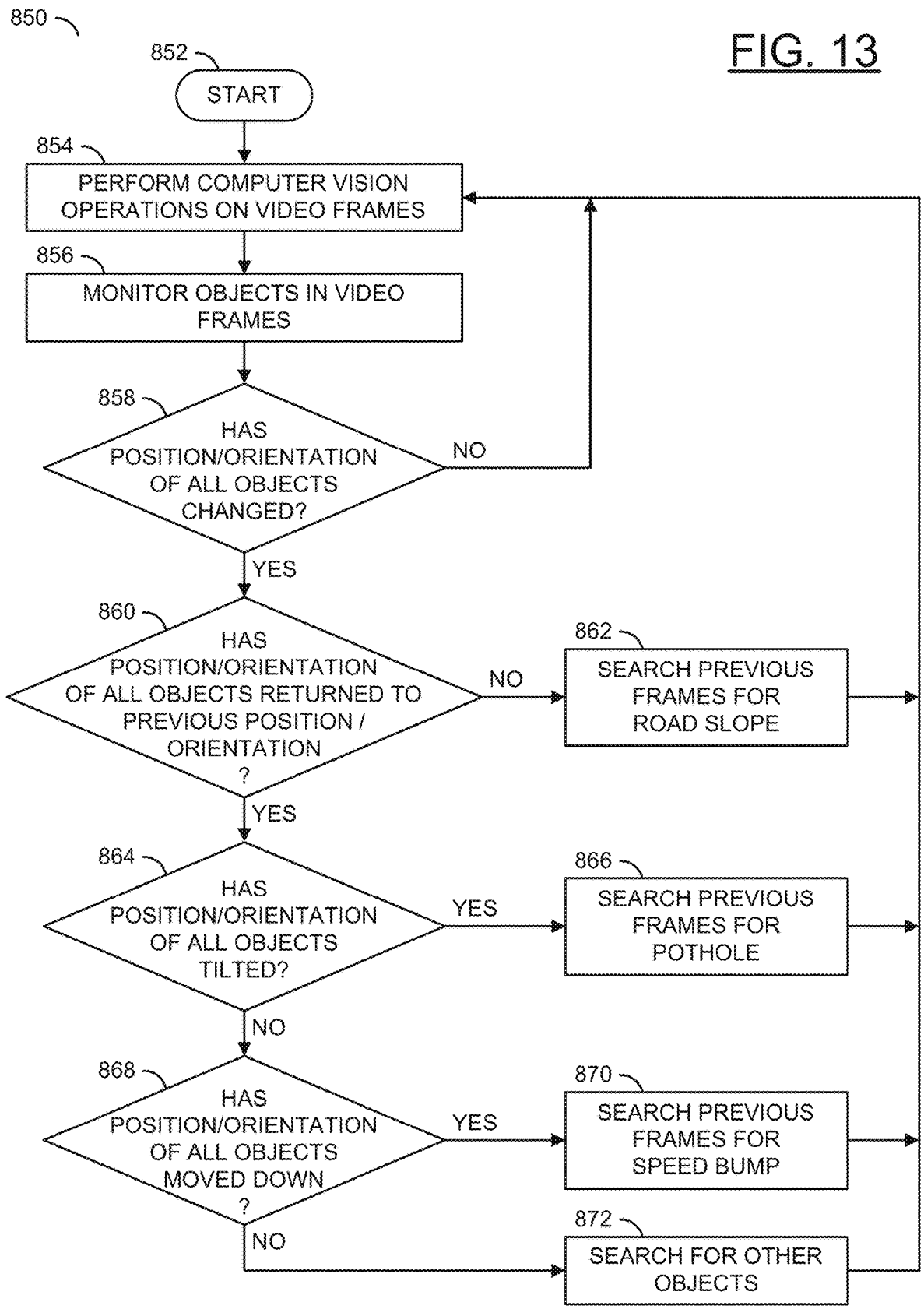
FIG. 13 is a flow diagram illustrating a method for detecting a change in orientation of an ego vehicle using computer vision.

Referring to FIG. 13, a method (or process) 850 is shown. The method 850 may detect a change in orientation of an ego vehicle using computer vision. The method 850 generally comprises a step (or state) 852, a step (or state) 854, a step (or state) 856, a decision step (or state) 858, a decision step (or state) 860, a step (or state) 862, a decision step (or state) 864, a step (or state) 866, a decision step (or state) 868, a step (or state) 870, and a step (or state) 872.

The step 852 may start the method 850. In the step 854, the processors 106a-106n may perform the computer vision operations on the video frames 700a-700l. Next, in the step 856 the processors 106a-106n may monitor for objects in the video frames. In an example, the processors 106a-106n may monitor for indications that the ego vehicle 50 has had a change in orientation. Next, the method 850 may move to the decision step 858.

In the decision step 858, the processors 106a-106n may determine whether the position and/or orientation of all objects detected in the video frames has changed (e.g., the location of the characteristics 534a-534d have changed location). In an example, if the position and/or orientation of one of the detected objects move in one video frame but other detected objects have not moved, then one detected object may have changed position/orientation with respect to the ego vehicle 50 (e.g., a car driving ahead of the ego vehicle 50 may have turned instead of remaining in front of the ego vehicle 50, which does not indicate a change in orientation of the ego vehicle 50). If the position and/or orientation of all of the objects detected in the video frames has not changed, then the method 850 may return to the step 854. If the position and/or orientation of all of the objects detected in the video frames has changed, then the method 850 may move to the decision step 860.

In the decision step 860, the processors 106a-106n may determine whether the position and/or orientation of all objects detected in the video frame has returned to a previous position and/or orientation. In an example, if the position and/or orientation of the detected objects move in one video frame and move back in another video frame, the processors 106a-106n may determine that there has been a bump. In another example, if the position and/or orientation of the detected objects move in one video frame and do not move back in another video frame, then the detected objects may have moved along a sloped road. If the position and/or orientation of the objects have not returned to a previous position, then the method 850 may move to the step 862. In the step 862, the processors 106a-106n may search the previous video frames 7001-700a (e.g., search in the last in first out sequence) for indications that the roadway 522 has sloped. Next, the method 850 may return to the step 854. In the decision step 860, if the position and/or orientation of the objects have returned to the previous position, then the method 850 may move to the decision step 864.

In the decision step 864, the processors 106a-106n may determine whether the position and/or orientation of all the detected objects have tilted. For example, the processors 106a-106n may have detected the tilted characteristics 594a'-594d' as shown in association with FIG. 8. If the position and/or orientation of all the detected objects have tilted, then the method 850 may move to the step 866. In the step 866, the processors 106a-106n may search the previous video frames 7001-700a (e.g., search in the last in first out sequence) for indications of the pothole 280b. Next, the method 850 may return to the step 854. In the decision step 864, if the position and/or orientation of all the objects have not tilted, then the method 850 may move to the decision step 868.

In the decision step 868, the processors 106a-106n may determine whether the position and/or orientation of all the detected objects have moved down. For example, the processors 106a-106n may detect the moved characteristics 534a'-534d' and/or the newly visible section 552 as shown in association with FIG. 7. If the position and/or orientation of all the detected objects have moved down, then the method 850 may move to the step 870. In the step 870, the processors 106a-106n may search the previous video frames 7001-700a (e.g., search in the last in first out sequence) for indications of the speed bump 280a. Next, the method 850 may return to the step 854. In the decision step 868, if the position and/or orientation of all the objects have not moved down, then the method 850 may move to the step 872. In the step 872, the processors 106a-106n may search the previous video frames 7001-700a (e.g., search in the last in first out sequence) to search for other objects that may correspond to a change in orientation of the ego vehicle 50 (e.g., rumble strips, debris on the road, animals, unpaved surface, snow, etc.). Next, the method 850 may return to the step 854.

Figure 14:
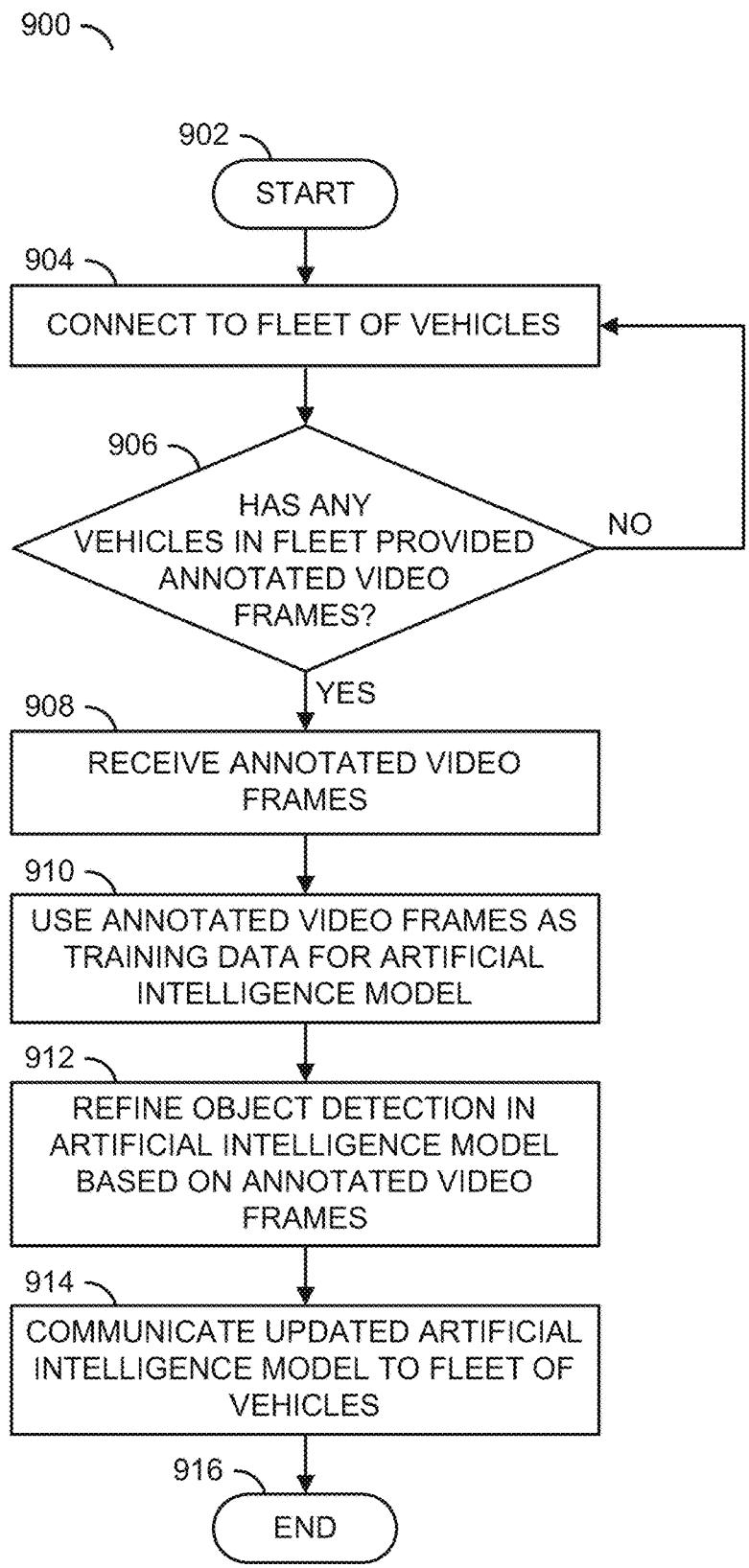
FIG. 14 is a flow diagram illustrating a method for training an artificial intelligence model with annotated video frames gathered using fleet learning.

Referring to FIG. 14, a method (or process) 900 is shown. The method 900 may train an artificial intelligence model with annotated video frames gathered using fleet learning. The method 900 generally comprises a step (or state) 902, a step (or state) 904, a decision step (or state) 906, a step (or state) 908, a step (or state) 910, a step (or state) 912, a step (or state) 914, and a step (or state) 916.

The step 902 may start the method 900. In the step 904, the server 710 may connect to a fleet of vehicles. The fleet of vehicles may comprise a number of vehicles (e.g., such as the ego vehicle 50) that implement the apparatus 100. In an example, the server 710 may be configured to provide updates to various components of the ego vehicle 50 and/or the apparatus 100. In another example, the server 710 may receive data (e.g., location data, diagnostics data, statistical data, etc.) from the ego vehicle 50 and/or the apparatus 100. In an example, each vehicle in the fleet of vehicles may have an 'always on' wireless connection using the communication device 110 to enable a communication to the server 710 and/or communication to other devices. Next, the method 900 may move to the decision step 906.

In the decision step 906, the server 710 may determine whether any of the vehicles in the fleet have provided annotated video frames (e.g., the annotated video frame 702). If no annotated video frames have been provided by any of the implementations of the apparatus 100 in the fleet of vehicles, then the method 900 may return to the step 904.

If annotated video frames have been received, then the method 900 may move to the step 908.

In the step 908, the central CNN module 150' may receive the annotated video frames (e.g., the annotated video frame 702). Next, in the step 910, the central CNN module 150' may use the annotated video frames as the training data 352a-352n to train the artificial intelligence model 712. In the step 912, the central CNN module 150' may refine the object detection of the obstacles 280a-280n in the artificial intelligence model 712 based on the annotated video frames. Next, in the step 914, the server 712 may communicate the updated (e.g., refined and/or enhanced) artificial intelligence model 712 to the apparatus 100 implemented by each vehicle in the fleet of vehicles. The updated artificial intelligence model 712 may enable the apparatus 100 to use the refinements to the artificial intelligence model 712 (e.g., updated detection libraries) when detecting objects. Next, the method 916 may move to the step 916. The step 916 may end the method 900.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a capture device configured to generate pixel data corresponding to an exterior view from a vehicle; and
    a processor configured to (i) process said pixel data arranged as video frames, (ii) perform computer vision operations on said video frames to (a) detect objects in said video frames and (b) determine characteristics of said objects, (iii) detect a temporary change in orientation of said vehicle in a direction different than a direction of travel of said vehicle at a first time, (iv) search backwards through a sequence of said video frames in response to said temporary change in orientation at said first time in order to analyze said characteristics of said objects at a second time to determine a cause of said temporary change in orientation of said vehicle and (v) generate annotations automatically by said processor for said video frames captured at said second time that comprise said objects determined to have caused said temporary change in orientation of said vehicle in response to determining said objects that have caused said temporary change in orientation of said vehicle, wherein said second time is earlier than said first time.

2. The apparatus according to claim 1, wherein said video frames having said annotations provide training data for an artificial intelligence model.

3. The apparatus according to claim 2, wherein (i) said artificial intelligence model is enhanced using said training data received from a fleet of vehicles and (ii) each vehicle in said fleet of vehicles comprises an implementation of said apparatus.

4. The apparatus according to claim 1, further comprising a wireless communication device configured to upload said video frames having said annotations to a distributed computing service.

5. The apparatus according to claim 1, wherein said objects determined to have caused said temporary change in orientation of said vehicle comprise speed bumps.

6. The apparatus according to claim 1, wherein said objects determined to have caused said temporary change in orientation of said vehicle comprise potholes.

7. The apparatus according to claim 1, wherein said objects determined to have caused said temporary change in orientation of said vehicle comprise a slope of a road.

8. The apparatus according to claim 1, wherein said capture device is a video camera located on a front of said vehicle and said objects determined to have caused said temporary change in orientation are detected approaching said front of said vehicle.

9. The apparatus according to claim 1, wherein (i) said vehicle comprises a sensor configured to detect said temporary change in orientation of said vehicle and (ii) said processor receives an output from said sensor indicating said temporary change in orientation of said vehicle.

10. The apparatus according to claim 9, wherein said sensor comprises a gyroscope.

11. The apparatus according to claim 1, wherein (i) an amount of said temporary change in orientation of said vehicle is determined in response to a strength of an impact detected by a sensor of said vehicle and (ii) said strength of said impact resulting from said objects determined to have caused said temporary change in orientation of said vehicle is isolated by said processor correcting for an amount of speed of said vehicle when said temporary change in orientation occurred.

12. The apparatus according to claim 1, wherein said processor is configured to determine said temporary change in orientation of said vehicle by monitoring said objects in said video frames.

13. The apparatus according to claim 12, wherein said processor is configured to monitor said objects in said video frames to determine said temporary change in orientation in response to (i) selecting reference points on one of said objects, (ii) determining a location of said reference points with respect to said video frame and (iii) detecting a change in said location of said reference points with respect to said video frame.

14. The apparatus according to claim 13, wherein said processor detects a bump in response to said location of said reference points moving towards a bottom of said video frames and then returning to a previous location.

15. The apparatus according to claim 13, wherein said processor detects a pothole in response to said location of said reference points moving along an angle and then returning to a previous location.

16. The apparatus according to claim 1, wherein said temporary change in orientation comprises detecting a change in vertical position of said vehicle.

17. The apparatus according to claim 1, wherein said temporary change in orientation comprises detecting a change along a roll axis of said vehicle.

18. The apparatus according to claim 1, wherein said temporary change in orientation comprises detecting a change along a pitch axis of said vehicle.

19. The apparatus according to claim 1, wherein (i) said processor is further configured to determine a type of said temporary change in orientation of said vehicle and (ii) said type of said temporary change in orientation of said vehicle provides a hint about said characteristics of said objects to search for in said sequence of said video frames from said first time.

20. The apparatus according to claim 1, wherein said video frames comprise raw pixel data converted into a picture format comprising a color format by a video processing pipeline implemented by said processor.

* * * * *